United States Patent
Greene

(10) Patent No.: US 9,840,745 B2
(45) Date of Patent: Dec. 12, 2017

(54) FOOTWEAR AND OTHER PRODUCTS INCORPORATING CULTURED LEATHER

(71) Applicant: NIKE, Inc., Beaverton, OR (US)

(72) Inventor: Pamela S. Greene, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 385 days.

(21) Appl. No.: 14/193,331

(22) Filed: Feb. 28, 2014

(65) Prior Publication Data

US 2014/0311193 A1 Oct. 23, 2014

Related U.S. Application Data

(62) Division of application No. 12/847,785, filed on Jul. 30, 2010, now Pat. No. 9,428,817.

(51) Int. Cl.

| | | |
|---|---|---|
| *C14C 13/02* | (2006.01) | |
| *A43B 23/02* | (2006.01) | |
| *A45C 3/00* | (2006.01) | |
| *B32B 9/02* | (2006.01) | |
| *A43B 1/02* | (2006.01) | |
| *B32B 5/18* | (2006.01) | |
| *B32B 5/24* | (2006.01) | |
| *B32B 9/04* | (2006.01) | |
| *B32B 25/04* | (2006.01) | |
| *B32B 3/06* | (2006.01) | |
| *B32B 3/26* | (2006.01) | |

(52) U.S. Cl.
CPC ............... *C14C 13/02* (2013.01); *A43B 1/02* (2013.01); *A43B 23/021* (2013.01); *A43B 23/026* (2013.01); *A43B 23/0235* (2013.01); *A45C 3/001* (2013.01); *B32B 3/06* (2013.01); *B32B 3/266* (2013.01); *B32B 5/18* (2013.01); *B32B 5/245* (2013.01); *B32B 9/025* (2013.01); *B32B 9/045* (2013.01); *B32B 9/046* (2013.01); *B32B 9/047* (2013.01); *B32B 25/045* (2013.01); *B32B 2266/0221* (2013.01); *B32B 2266/0278* (2013.01); *B32B 2307/546* (2013.01); *B32B 2307/554* (2013.01); *B32B 2307/732* (2013.01); *B32B 2437/00* (2013.01); *B32B 2437/02* (2013.01); *B32B 2439/06* (2013.01); *B32B 2601/00* (2013.01); *Y10T 428/1348* (2015.01); *Y10T 428/31768* (2015.04)

(58) Field of Classification Search
None
See application file for complete search history.

(56) References Cited

U.S. PATENT DOCUMENTS

| | | |
|---|---|---|
| 2,398,623 A | 4/1946 | Daniels |
| 2,673,171 A | 3/1954 | Bellavoine |
| 4,325,236 A | 4/1982 | Tsui |
| 5,371,957 A | 12/1994 | Gaudio |
| 5,659,914 A | 8/1997 | Steinlauf |
| 6,962,010 B2 | 11/2005 | Huff |
| 2007/0184742 A1 | 8/2007 | Coulson |
| 2009/0286092 A1 | 11/2009 | Azar-Pey |
| 2011/0196328 A1* | 8/2011 | Bellini ................. A61L 27/60 604/367 |

FOREIGN PATENT DOCUMENTS

EP 1589098 10/2005

OTHER PUBLICATIONS

Anika product brochure, "Hyaluronate Formats", pp. 1-2, retrieved from the internet Feb. 17, 2016: www.anikatherapeutics.com/technology/hyaluronate-formats/.*
Anika, HyaloFast, HYAFF 3D Scaffold, retrieved from the internet, Mar. 9, 2016: www.google.com/search?q=hyaff-11+scaffold&biw=1920&bih=976&tbm=isch&tbo=u&source=univ&sa=X&ved=0ahUKEwjvurD96LTLAhVS9mMKHVgCACwQsAQIVg#imgrc=bnGc5HtVFDic-M%3A.*
Article entitled, "Victimless Leather—A Prototype of Stitch-less Jacket grown in a Technoscientific 'Body'" available at http://www.tca.uwa.edu.au/vl/vl.html (last visited Sep. 20, 2013).
http://www.tca.uwa.edu.au/vl/images.html (last visited Sep. 20, 2013).
Article entitled, "The Tissue Culture and Art Project: The Manifesto" available at http://tcaproject.org/ (last visited Sep. 20, 2013).
Article entitled "Victimless Leather: A Prototype of Stitch-less Jacket grown in a Technoscientific 'Body', 2004" available at http://tcaproject.org/projects/victimless/leather (last visited Sep. 20, 2013).
Article entitled "Victimless Leather" available at http://en.wikipedia.org/wiki/Victimless_Leather (last visited Sep. 20, 2013).
Article entitled, "Cell Culture" as published on www.wikipedia.com and downloaded Dec. 6, 2010.
USPTO, Final Office Action for U.S. Appl. No. 12/847,785, dated Jan. 29, 2016.

* cited by examiner

Primary Examiner — Thane Underdahl
Assistant Examiner — Yvonne Pyla
(74) Attorney, Agent, or Firm — Honigman Miller Schwartz and Cohn LLP; Matthew H. Szalach; Jonathan P. O'Brien

(57) ABSTRACT

A variety of products may incorporate cultured leather, which is produced in vitro. Examples of products that may incorporate cultured leather include footwear, apparel, athletic equipment, furniture, handbags or any other consumer or industrial product that commonly incorporates conventional leather or synthetic leather.

14 Claims, 22 Drawing Sheets

FOOTWEAR AND OTHER PRODUCTS INCORPORATING CULTURED LEATHER

CROSS-REFERENCE TO RELATED APPLICATION

This application is a divisional of U.S. patent application Ser. No. 12/847,785 filed on Jul. 30, 2012, and published on Feb. 2, 2012 as Publication Number 2012/0023777, entitled "Footwear and Other Products Incorporating Cultured Leather," the entirety of which is hereby incorporated by reference.

BACKGROUND

Conventional articles of footwear generally include two primary elements, an upper and a sole structure. The upper is secured to the sole structure and forms a void on the interior of the footwear for comfortably and securely receiving a foot. The sole structure is secured to a lower area of the upper, thereby being positioned between the upper and the ground. In athletic footwear, for example, the sole structure may include a midsole and an outsole. The midsole often includes a polymer foam material that attenuates ground reaction forces to lessen stresses upon the foot and leg during walking, running, and other ambulatory activities. Additionally, the midsole may include fluid-filled chambers, plates, moderators, or other elements that further attenuate forces, enhance stability, or influence the motions of the foot. The outsole is secured to a lower surface of the midsole and provides a ground-engaging portion of the sole structure formed from a durable and wear-resistant material, usually rubber. The sole structure may also include a sockliner positioned within the void and proximal a lower surface of the foot to enhance footwear comfort.

The upper generally extends over the instep and toe areas of the foot, along the medial and lateral sides of the foot, under the foot, and around the heel area of the foot. In some articles of footwear, such as basketball footwear and boots, the upper may extend upward and around the ankle to provide support or protection for the ankle. Access to the void on the interior of the upper is generally provided by an ankle opening in a heel region of the footwear. A lacing system is often incorporated into the upper to adjust the fit of the upper, thereby permitting entry and removal of the foot from the void within the upper. The lacing system also permits the wearer to modify certain dimensions of the upper, particularly girth, to accommodate feet with varying dimensions. In addition, the upper may include a tongue that extends under the lacing system to enhance adjustability of the footwear, and the upper may incorporate a heel counter to limit movement of the heel. A variety of material elements (e.g., textiles, polymer foam, polymer sheets, leather, synthetic leather) are conventionally utilized in manufacturing the upper. In athletic footwear, for example, the upper may have multiple layers that each include a variety of joined material elements.

SUMMARY

Cultured leather may be incorporated into a variety of products. In comparison with conventional leather, cultured leather is produced in vitro, which involves manufacturing the cultured leather in a laboratory or other controlled environment without growing in living organisms or harvesting from the living organisms. Examples of products that may incorporate cultured leather include footwear, apparel, athletic equipment, furniture, bags, or any other consumer or industrial product that commonly incorporates conventional leather or synthetic leather.

The advantages and features of novelty characterizing aspects of the invention are pointed out with particularity in the appended claims. To gain an improved understanding of the advantages and features of novelty, however, reference may be made to the following descriptive matter and accompanying figures that describe and illustrate various configurations and concepts related to the invention.

FIGURE DESCRIPTIONS

The foregoing Summary and the following Detailed Description will be better understood when read in conjunction with the accompanying figures.

DETAILED DESCRIPTION

The following discussion and accompanying figures disclose various products that incorporate cultured leather. Conventional leather is generally produced in vivo, which involves harvesting skins for the conventional leather from living organisms (e.g., alligator, buffalo, cow, crocodile, deer, elk, goat, kangaroo, lamb, ostrich, pig, snake, yak). In comparison, cultured leather is produced in vitro, which involves manufacturing the cultured leather in a laboratory or other controlled environment without growing in living organisms or harvesting from the living organisms. An advantage to in vitro leather production is that the cultured leather may be engineered and grown to exhibit particular properties, such as (a) uniform consistency and thickness, (b) enhanced strength, stretch, flexibility, breathability, and resistance to abrasion, (c) three-dimensional or shaped configurations, and (d) desired surface textures or other aesthetic characteristics. Moreover, the specific combination of properties selected for the cultured leather may not exist in conventional leathers from any individual living organism. Additional advantages of in vitro leather production relate to various environmental and animal rights issues. For example, animal husbandry practices (e.g., ranching, breeding) may utilize significant land and water resources and contribute to the production of waste products and greenhouse gasses, and the harvesting of skins for conventional leather may be considered contrary to animal rights. Furthermore, the time required for producing cultured leather may be significantly shorter than the time required to raise an organism to a marketable size. Cultured leather also has advantages over synthetic leather (i.e., a polymer-based leather substitute), which is generally non-recyclable, petroleum-dependent, formed through a solvent-dependent process, and relatively slow to biodegrade. Accordingly, the production of cultured leather may allow particular properties to be engineered into the resulting product, while reducing impacts upon the environment and the living organisms from which conventional leather is harvested.

Footwear Configuration

Figure 1:
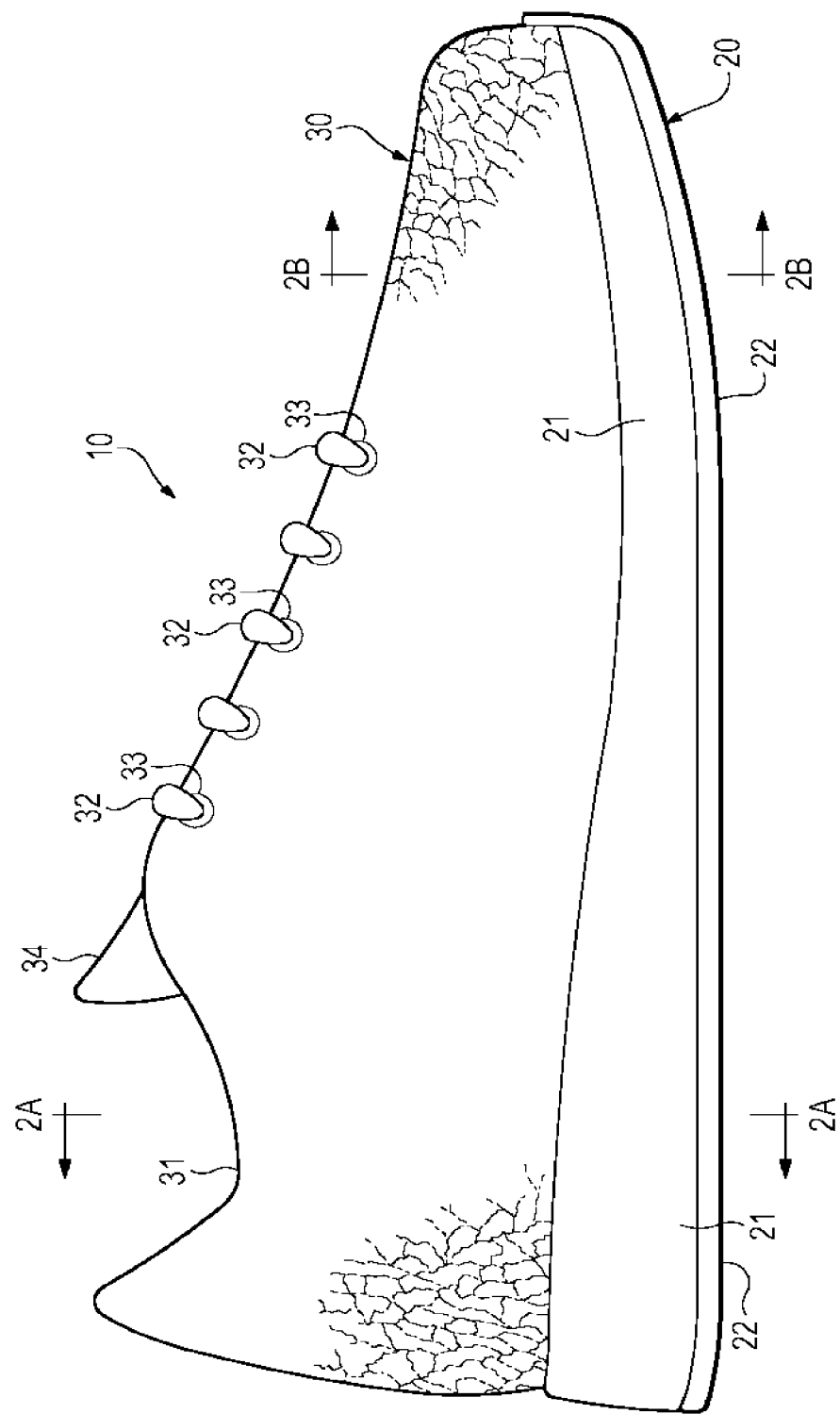
FIG. 1 is side elevational view of an article of footwear.

An article of footwear 10 that incorporates cultured leather is depicted in FIG. 1 as having a general configuration of an athletic shoe. A variety of athletic shoe styles, in addition to footwear 10, may incorporate cultured leather or concepts related to the cultured leather, including basketball shoes, cross-training shoes, cycling shoes, football shoes, golf shoes, running shoes, soccer shoes, tennis shoes, and walking shoes, for example. Cultured leather may also be utilized with a wide variety of further footwear styles, such as dress shoes, loafers, sandals, and boots. Moreover, the cultured leather may be incorporated into an array of other products, including apparel, athletic equipment, furniture, bags, or any other consumer or industrial product that commonly incorporates conventional leather or synthetic leather. Accordingly, cultured leather or concepts related to the cultured leather may be utilized with a variety of products.

Footwear 10 includes a sole structure 20 and an upper 30. Sole structure 20 is secured to upper 30 and extends between the foot and the ground when footwear 10 is worn. The primary elements of sole structure 20 are a midsole 21 and an outsole 22. Midsole 21 is secured to a lower surface of upper 30 and may be formed from a compressible polymer foam element (e.g., a polyurethane or ethylvinylacetate foam) that attenuates ground reaction forces (i.e., provides cushioning) when compressed between the foot and the ground during walking, running, or other ambulatory activities. In further configurations, midsole 21 may incorporate plates, moderators, fluid-filled chambers, lasting elements, or motion control members that further attenuate forces, enhance stability, or influence the motions of the foot, or midsole 21 may be primarily formed from a fluid-filled chamber. Outsole 22 is secured to a lower surface of midsole 21 and may be formed from a wear-resistant rubber material that is textured to impart traction. A sockliner 23 is also be located within upper 30 and positioned to extend under a lower surface of the foot. Although this configuration for sole structure 20 provides an example of a sole structure that may be used in connection with upper 30, a variety of other conventional or nonconventional configurations for sole structure 20 may also be utilized. Accordingly, the features of sole structure 20 or any sole structure utilized with upper 30 may vary considerably.

Upper 30 defines a void within footwear 10 for receiving and securing a foot relative to sole structure 20. The void is shaped to accommodate the foot and extends along the lateral side of the foot, along the medial side of the foot, over the foot, around the heel, and under the foot. Access to the void is provided by an ankle opening 31 located in at least a heel region of footwear 10. A lace 32 extends through various lace apertures 33 or other lace-receiving elements (e.g., D-rings, hooks) in a throat area of upper 30 and permits the wearer to modify dimensions of upper 30 to accommodate the proportions of the foot. More particularly, lace 32 permits the wearer to tighten upper 30 around the foot, and lace 32 permits the wearer to loosen upper 30 to facilitate entry and removal of the foot from the void through ankle opening 31. In addition, upper 30 includes a tongue 34 that extends between the interior void and lace 32.

Figure 2A:
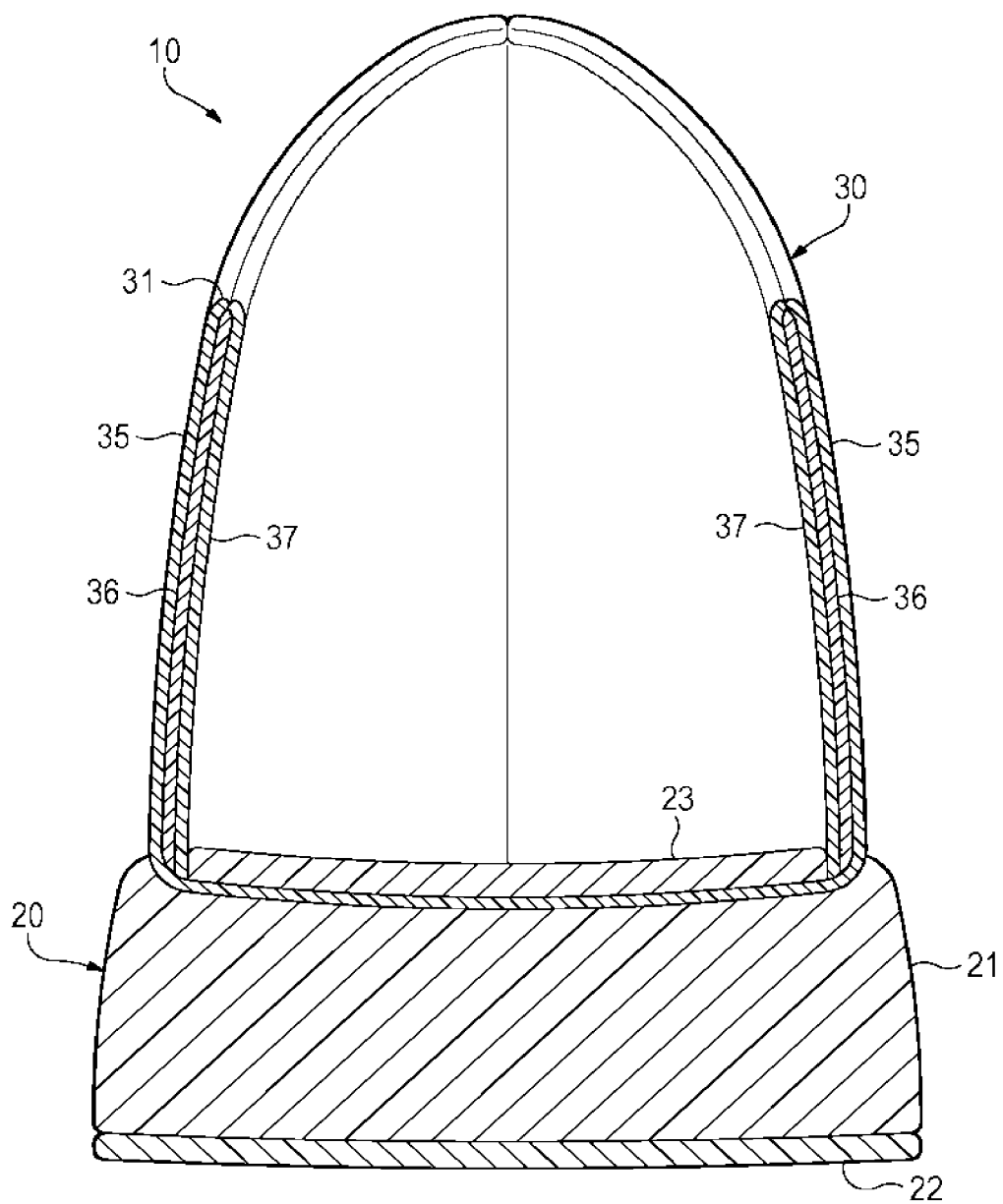
FIGS. 2A and 2B are cross-sectional views of the article of footwear, as respectively defined by section lines 2A and 2B in FIG. 1.
Figure 2B:
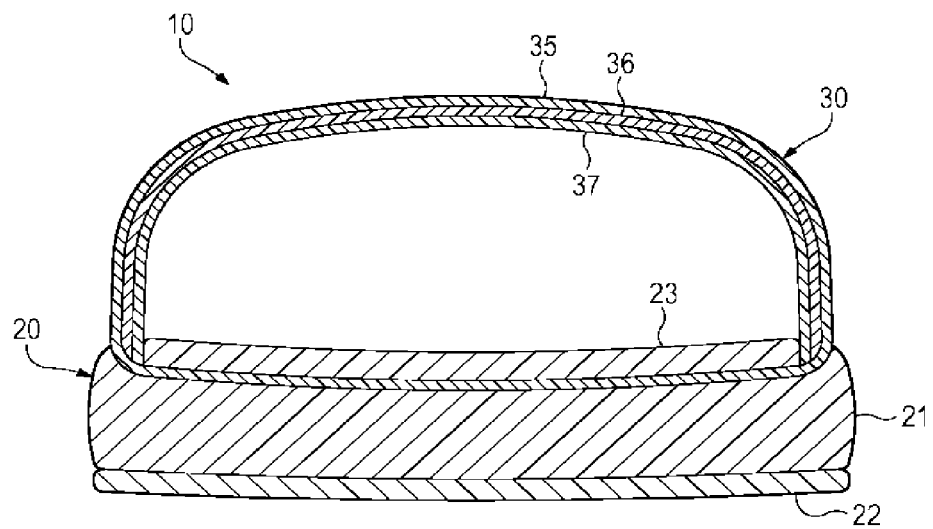

Upper 30 exhibits a layered configuration that includes an outer layer 35, an intermediate layer 36, and an inner layer 37, as shown in FIGS. 2A and 2B. Outer layer 35 forms at least a portion of an outer surface of footwear 10. Intermediate layer 36 is positioned between layers 35 and 37. Additionally, inner layer 37 forms at least a portion of an inner surface that defines the void within upper 30 and contacts the foot or a sock worn over the foot. In some configurations, upper 30 may also incorporate a heel counter that limits heel movement in the heel region or a wear-resistant toe guard located in a forefoot region of footwear 10. Upper 30 may also incorporate further elements that provide structural advantages or enhance the aesthetics of footwear 10.

Layers 35-37 may be formed from one or more of a plurality of material elements that include cultured leather, synthetic leather, conventional leather, textile elements, polymer sheets, or polymer foam. As an example, outer layer 35 may be formed from cultured leather, intermediate layer 36 may be formed from polymer foam to provide protection or cushioning to the foot, and inner layer 37 may be formed from a textile element that absorbs moisture and enhances comfort. Forming outer layer 35 from cultured leather imparts many of the properties of conventional leather, including relatively high strength, resistance to abrasion, and aesthetic appeal. Moreover, forming outer layer 35 from cultured leather imparts one or more additional properties, as discussed above, including (a) uniform consistency and thickness, (b) enhanced strength, stretch, flexibility, breathability, and resistance to abrasion, (c) three-dimensional or shaped configurations, and (d) desired surface textures or other aesthetic characteristics. That is, forming outer layer 35 from cultured leather imparts the advantage of providing a desired combination of properties, which may be engineered into the cultured leather. Additionally, forming outer layer 35 from cultured leather reduces impacts upon the environment and the living organisms.

Although cultured leather may be utilized for outer layer 35, cultured leather may also be utilized for either of intermediate layer 36 and inner layer 37. Moreover, cultured leather may also be utilized for only a portion of outer layer 35, with another material forming a remainder of outer layer 35. In a further configuration of upper 30, intermediate layer 36 may be absent, in which case the cultured leather of outer layer 35 may be utilized with a textile material of inner layer 37, for example, or both of layers 35 and 37 may be formed from elements of the cultured leather. Similarly, both of layers 36 and 37 may be absent such that the cultured leather of outer layer 35 forms both the exterior and interior surfaces of upper 30. In another configuration, the cultured leather of outer layer 35 may define apertures that expose areas of intermediate layer 36. Accordingly, the cultured leather may be incorporated into a variety of configurations of upper 30, and the cultured leather may be incorporated into upper 30 in a variety of locations.

Cultured Leather Configuration

Figure 3:
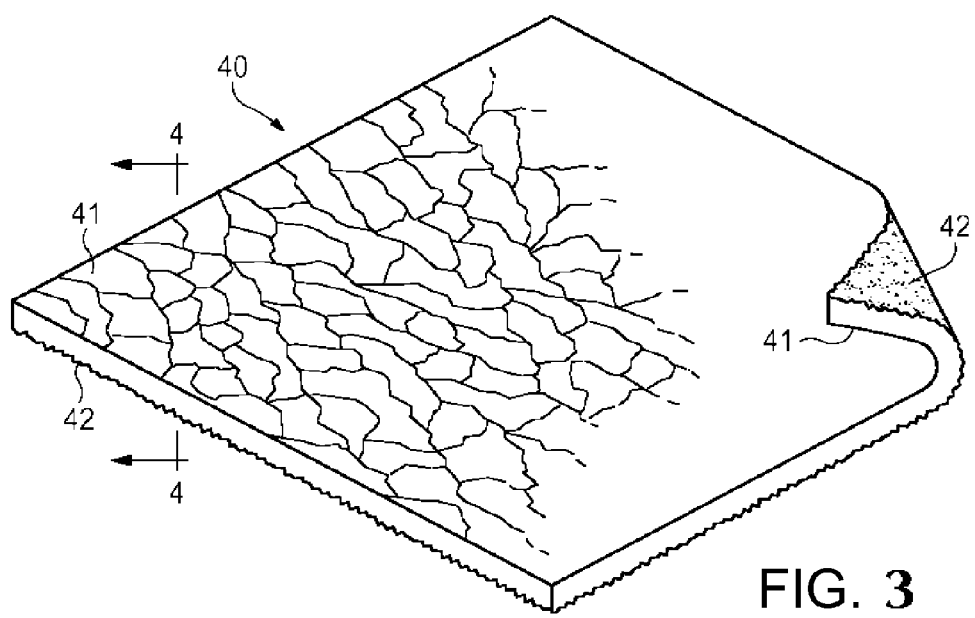
FIG. 3 is a perspective view of an element of cultured leather.
Figure 4:
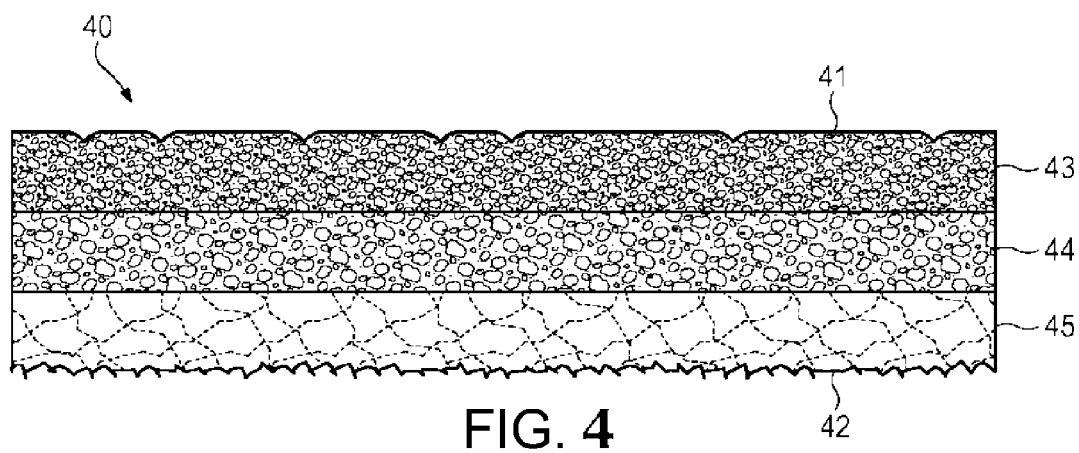
FIG. 4 is a cross-sectional view of the element of cultured leather, as defined by section line 4-4 in FIG. 3.

An element of cultured leather 40 is depicted in FIGS. 3 and 4 as having the general appearance and properties of conventional leather, such as conventional cowhide leather (e.g., leather produced in vivo and harvested from a cow). As such, cultured leather 40 exhibits relatively high strength, resistance to abrasion, and aesthetic appeal. Cultured leather 40 has a first surface 41 and an opposite second surface 42. Whereas first surface 41 has a finished and grained appearance, second surface 42 may be rougher and less finished. When incorporated into footwear 10 (e.g., as outer layer 35) or other products, first surface 41 generally faces outward. Additionally, cultured leather 40 has a layered or stratified configuration that includes a first stratum 43, a second stratum 44, and a third stratum 45. In conventional leather, for example, (a) the upper section or stratum is called the grain, which is the external dermal portion that grew hair, (b) the center section or stratum is termed the corium, and (c) the lower section or stratum is termed the flesh side. First stratum 43 forms first surface 41 and exhibits many properties of the grain from conventional leather. Second stratum 44 is positioned between strata 43 and 45 and exhibits many properties of the corium from conventional leather. Additionally, third stratum 45 forms second surface 42 and exhibits many properties of the flesh side from conventional leather. Accordingly, cultured leather 40 may exhibit many of the features and properties of conventional leather.

The configuration of cultured leather 40 discussed above incorporates many of the features and properties of conventional leather. That is, cultured leather 40 may be substantially identical to conventional leather in appearance, strength, and resistance to abrasion, for example. Moreover, consumers (e.g., wearers of footwear 10) may perceive no difference between cultured leather 40 and conventional leather. As such, cultured leather 40 may be utilized to replace conventional leather in many products, including footwear 10, apparel, athletic equipment, furniture, handbags or any other consumer or industrial product that commonly incorporates conventional leather. In contrast with conventional leather, however, cultured leather 40 is produced in vitro, which involves manufacturing the cultured leather in a laboratory or other controlled environment without growing in living organisms or harvesting from the living organisms. Additionally, producing cultured leather 40 in vitro reduces impacts upon the environment and living organisms. Accordingly, cultured leather 40 may have advantages over conventional leather even when cultured leather 40 is substantially identical to conventional leather.

Further Cultured Leather Configurations

Although cultured leather 40 may be substantially identical to conventional leather, cultured leather 40 may be produced in a manner that allows a combination of properties to be engineered into the resulting product. For example, cultured leather 40 may be engineered and grown in vitro to exhibit particular properties, such as (a) uniform consistency and thickness, (b) enhanced strength, stretch, flexibility, breathability, and resistance to abrasion, (c) three-dimensional or shaped configurations, and (d) desired surface textures or other aesthetic characteristics. That is, a desired combination of properties may be engineered into the structure of cultured leather 40 through in vitro production. Moreover, this desired combination of properties may enhance cultured leather 40 when compared to conventional leather.

Cultured leather 40 is discussed above as having the general appearance and properties of conventional leather, such as conventional cowhide leather. When producing cultured leather 40 though an in vitro process, dermal cells from a cow may be utilized. More particularly, dermal cells from a cow may be grown in vitro to form tissue that resembles conventional cowhide leather. In order to vary the properties of cultured leather 40, however, (a) in vitro production techniques may be varied, (b) genetically-modified dermal cells may be incorporated into cultured leather 40, (c) cells with genetic material from at least two organisms (e.g., transgenic cells) may be incorporated into cultured leather 40, (d) cells from other organisms (e.g., alligator, buffalo, crocodile, deer, elk, goat, kangaroo, lamb, ostrich, pig, snake, yak) may be utilized, (e) keratins or chitins may be bioengineered into cultured leather 40, or (f) plant, fungal, or bacterial DNA may be incorporated into the cells forming cultured leather 40. That is, cultured leather 40 may have the general appearance and properties of conventional leather, but may be formed through a variety of techniques or from a variety of cells.

Figure 5A:
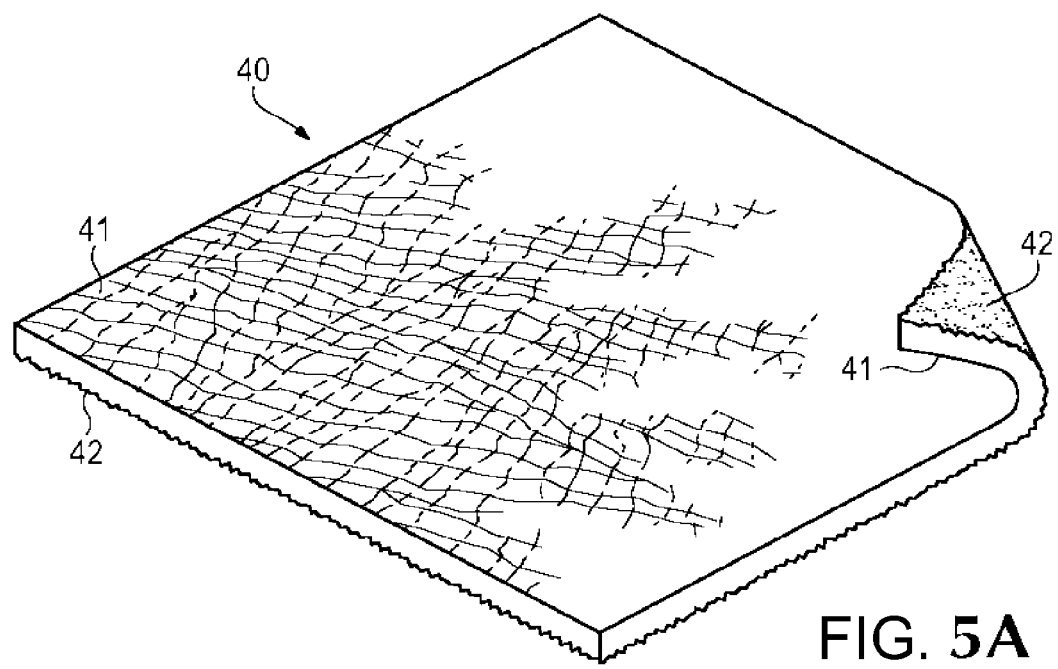
FIGS. 5A-5F are perspective views corresponding with FIG. 3 and depicting further configurations of the element of cultured leather.
Figure 5B:
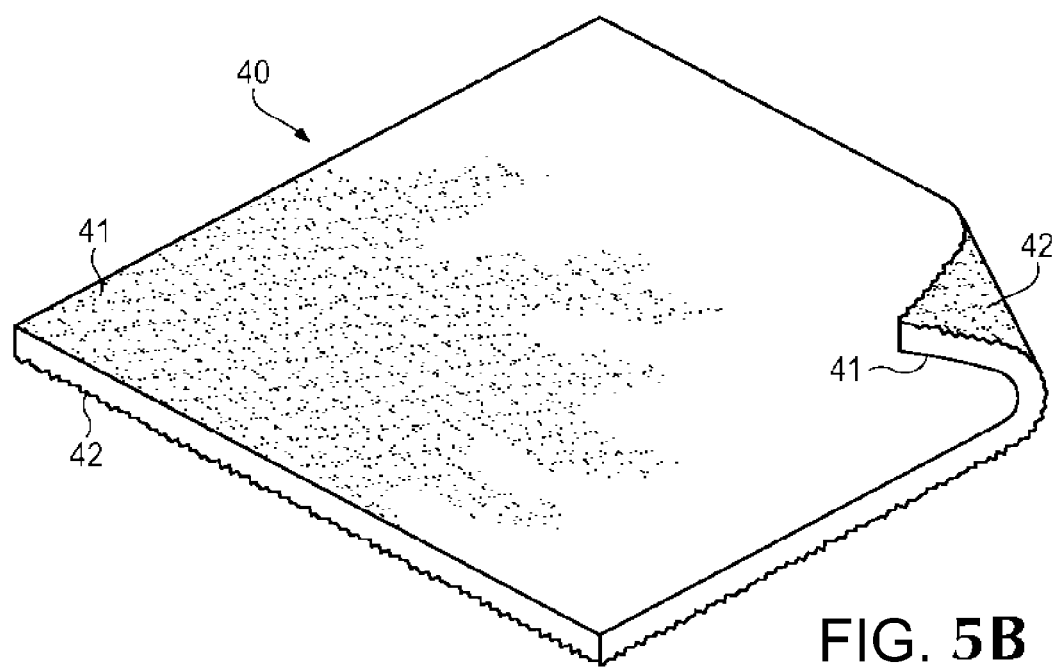
Figure 5C:
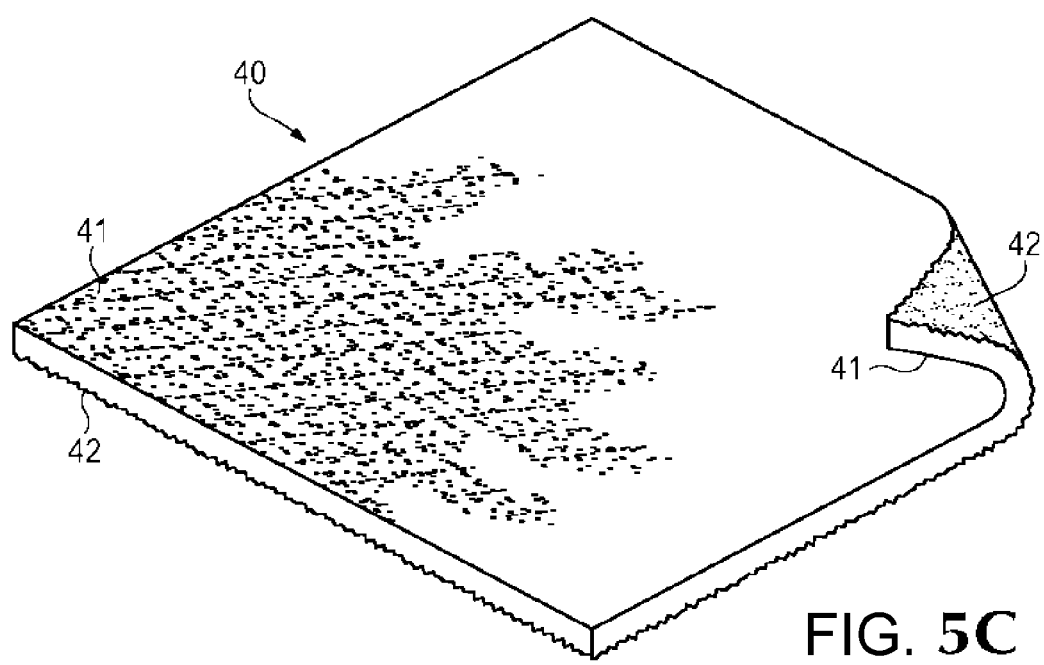
Figure 5D:
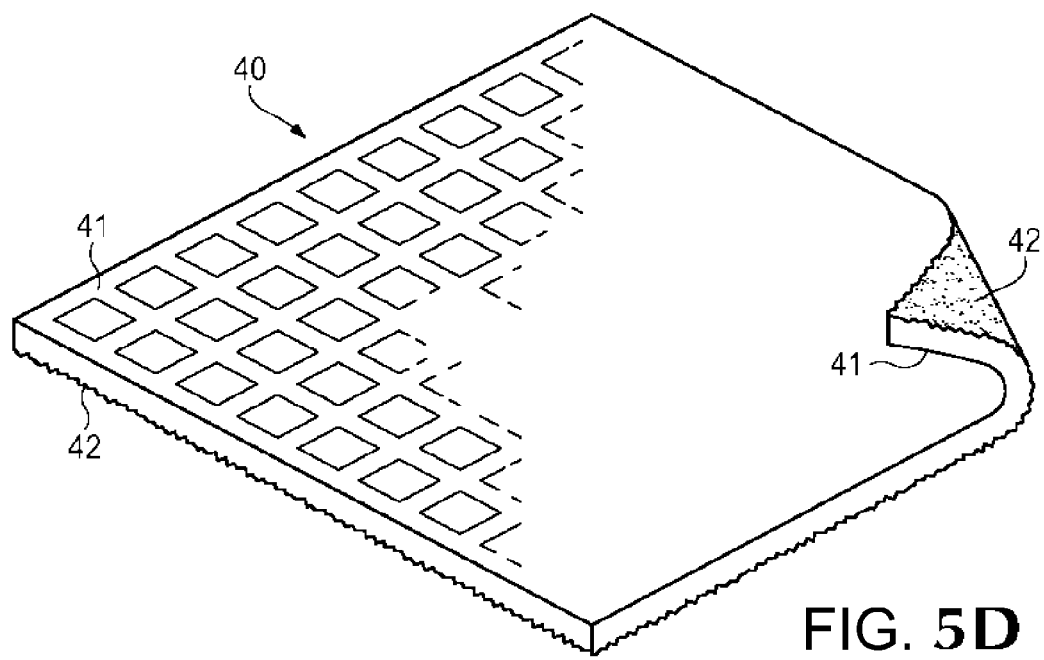
Figure 5E:
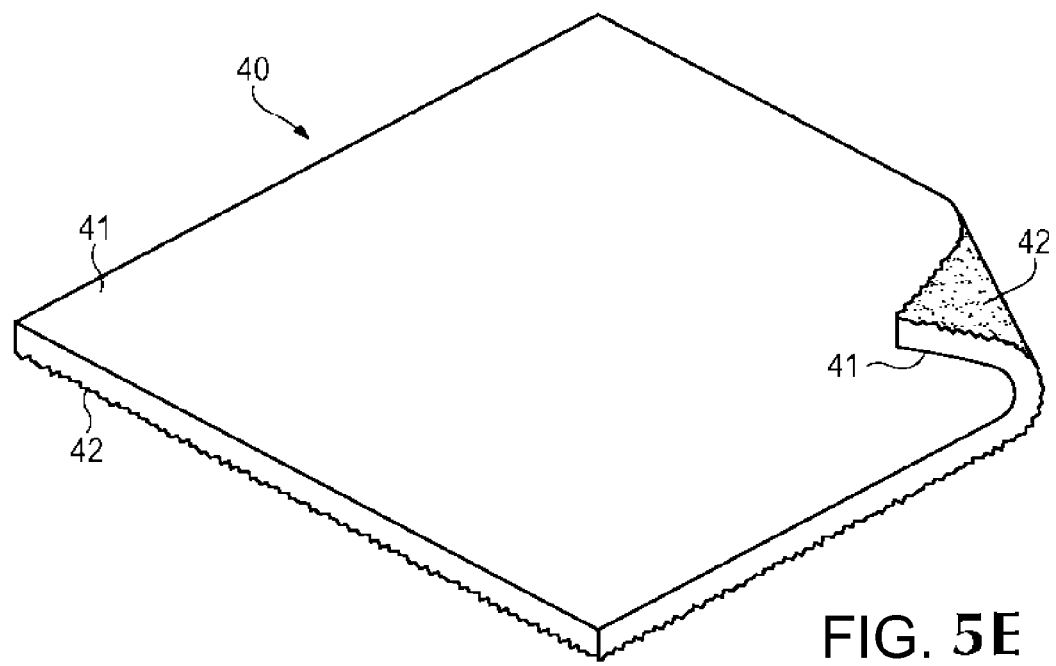

Although cultured leather 40 may resemble conventional leather, the overall appearance of cultured leather 40 (e.g., the texture or grain in first surface 41) may vary. As an example, first surface 41 of cultured leather 40 exhibits a texture similar to alligator or crocodile skin in FIG. 5A. A configuration wherein first surface 41 exhibits a dimpled texture similar to pig skin is depicted in FIG. 5B, and a similar texture with more pronounced dimpling is depicted in FIG. 5C. Similarly, first surface 41 may also impart the appearance of conventional leather from buffalo, deer, elk, goat, kangaroo, lamb, ostrich, snake, or yak, for example. Although first surface 41 may exhibit a texture similar to various types of conventional leather, first surface 41 may also exhibit a texture that does not generally occur in nature, as in FIG. 5D. Moreover, first surface 41 may be generally smooth or untextured, as in FIG. 5E. Although the properties of cultured leather 40 may be similar to conventional cowhide leather even when first surface 41 imparts the appearance of other organisms, the properties of cultured leather 40 may also vary depending upon the specific in vitro production techniques or dermal cells that are utilized. That is, the properties of cultured leather 40, as well as the appearance, may vary significantly.

Figure 5F:
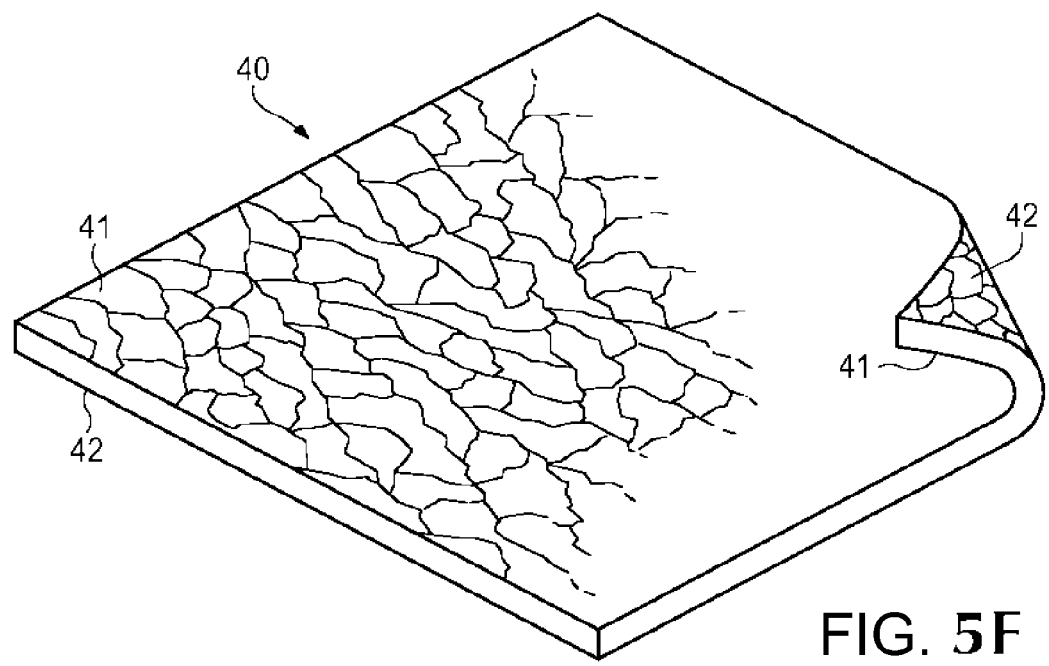

Referring to the configuration of FIGS. 3 and 4, first surface 41 has a finished and grained appearance, whereas second surface 42 is rougher and less finished. In contrast, FIG. 5F depicts a configuration wherein both surfaces 41 and 42 have a finished and grained appearance. Unlike conventional leather, therefore, the flesh side is absent and replaced with a section or stratum similar to the grain. An advantage to forming both surfaces 41 and 42 to have a finished and grained appearance is that cultured leather 40 may be utilized in applications where both surfaces 41 and 42 are exposed. Additionally, the use of grain-type strata for both of surfaces 41 and 42 may enhance the resistance to abrasion in cultured leather 40.

Figure 6A:
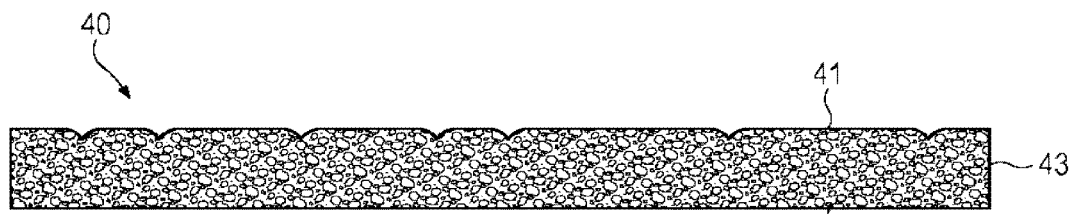
FIGS. 6A-6M are cross-sectional views corresponding with FIG. 4 and depicting further configurations of the element of cultured leather.
Figure 6B:
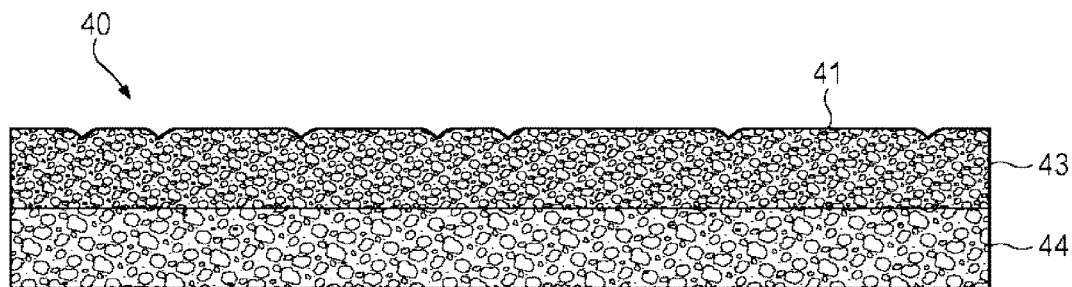
Figure 6C:
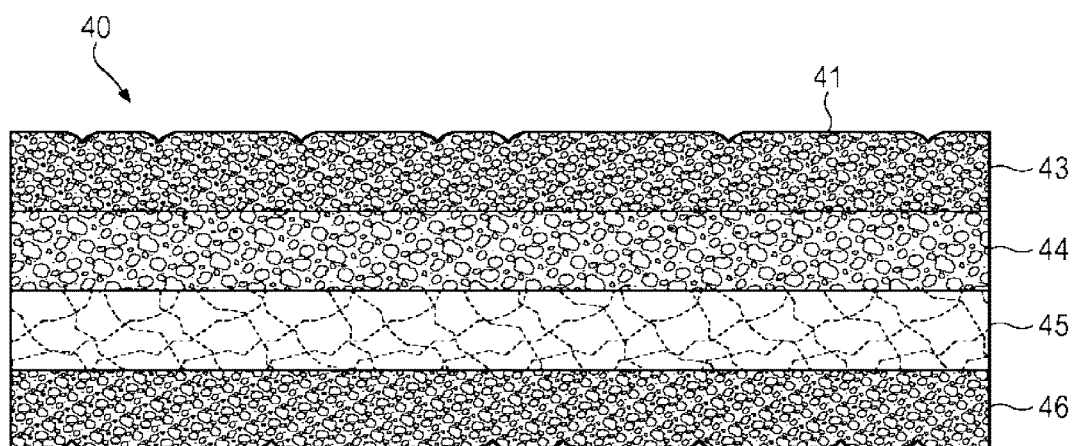

Cultured leather 40, as discussed above, may be formed through a variety of in vitro production techniques or from various types of dermal cells. Another manner of varying the properties of cultured leather 40 relates to the overall structure of cultured leather 40. As an example, the number of strata (i.e., strata 43-45) may be varied. Referring to FIG. 6A, for example, cultured leather 40 has a configuration wherein only first stratum 43 is present. A configuration wherein only strata 43 and 44 are present is depicted in FIG. 6B. Additionally, a configuration wherein a fourth stratum 46 is present is depicted in FIG. 6C. Each of the grain, corium, and flesh side, for example, impart different properties to conventional leather. By varying the number of strata (i.e., strata 43-46) and the composition of the strata (e.g., grain, corium, flesh side), a variety of different properties may be incorporated into cultured leather 40. Moreover, in vitro production techniques may permit the formation of other types of strata with properties that are different than the properties of the grain, corium, and flesh side, thereby permitting even greater variation in the properties of cultured leather 40.

Figure 6D:
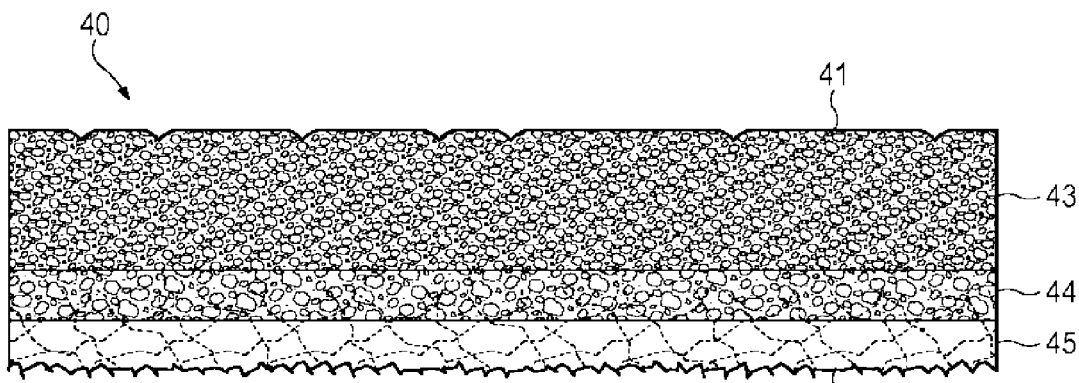
Figure 6E:
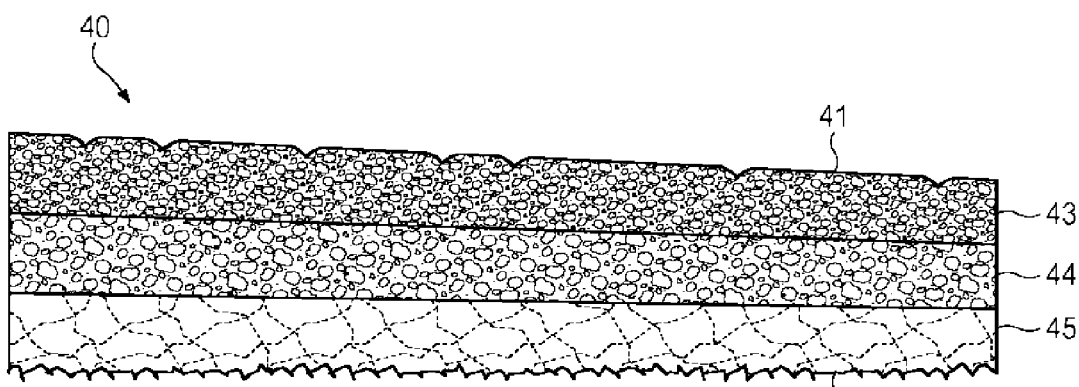
Figure 6F:
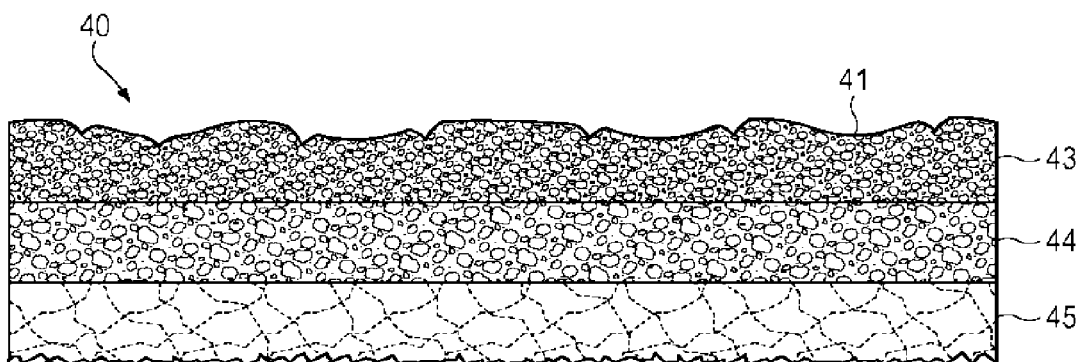
Figure 6G:
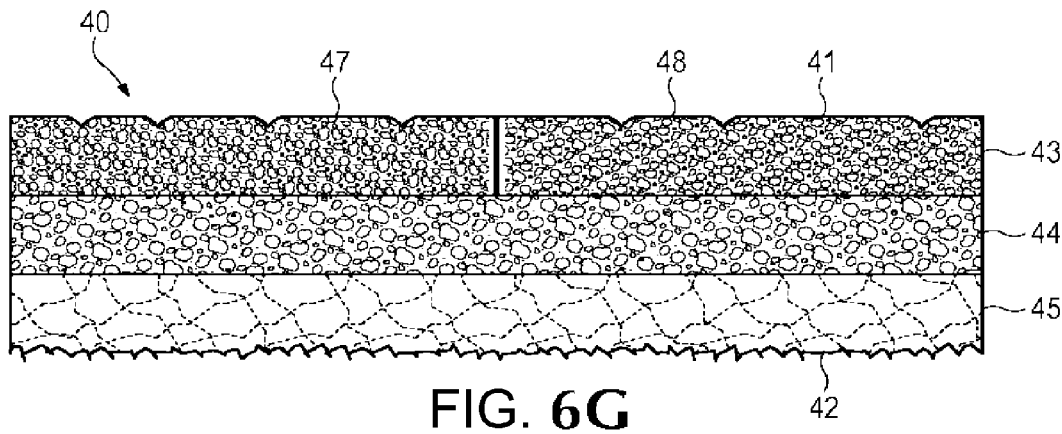

A further manner of varying the properties of cultured leather 40 relates to the thickness of cultured leather 40. Referring to FIG. 6D, first stratum 43 exhibits greater thickness than strata 44 and 45. In this configuration, the properties of first stratum 43 may predominate due to the greater thickness of first stratum 43. Cultured leather 40 may also exhibit a varying thickness, as in a tapered configuration depicted in FIG. 6E and an undulating configuration depicted in FIG. 6F. As a further possibility, FIG. 6G depicts a configuration wherein first stratum 43 includes a pair of regions 47 and 48. Each of regions 47 and 48 may impart different properties to different areas of cultured leather 40.

Figure 6H:
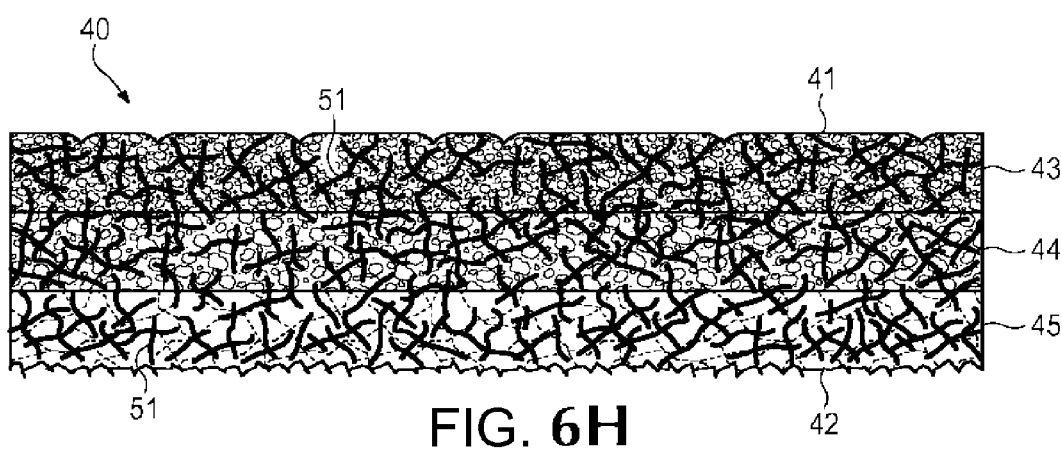
Figure 6I:
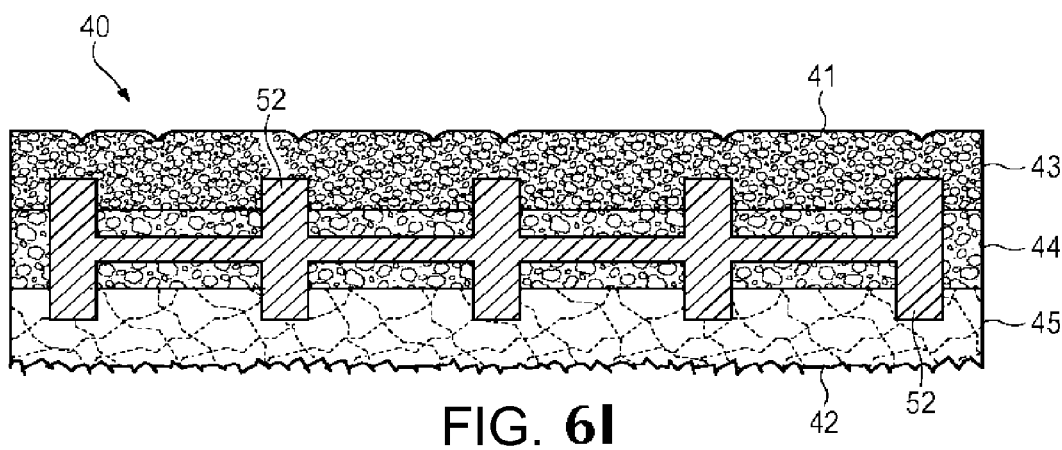
Figure 6J:
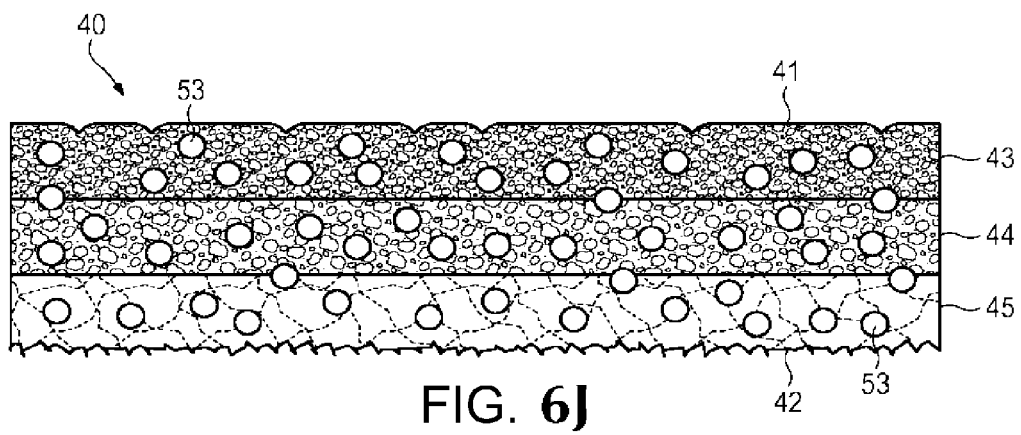
Figure 6K:
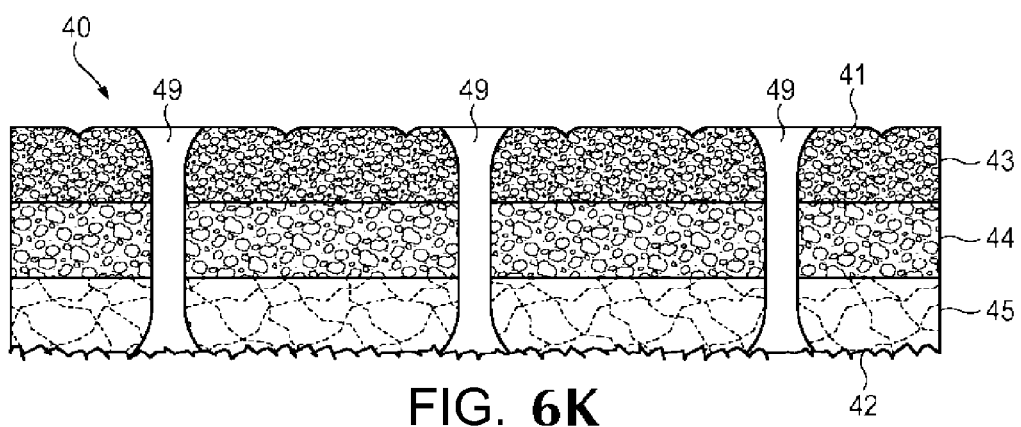

Another manner of varying the properties of cultured leather 40 relates to the addition or further elements to cultured leather 40. As an example, FIG. 6H depicts a configuration wherein fibers of collagen 51 extend throughout each of strata 43-45. Collagen is a naturally-occurring protein and forms connective tissue between cells. By increasing the presence of collagen 51, the overall strength, as well as other properties, of cultured leather 40 may increase. As another example, a reinforcing structure 52 extends across cultured leather 40 in FIG. 6I. Reinforcing structure 52 is embedded within cultured leather 40 and may be placed during in vitro production such that the cells forming cultured leather 40 grow to surround reinforcing structure 52. In this manner, reinforcing structure 52 may be a scaffold upon which cultured leather 40 is produced. In addition to adding strength, reinforcing structure 52 may add stiffness, for example. Another configuration wherein a plurality of spherical members 53 extend through cultured leather 40 is depicted in FIG. 6J. Spherical members 53 may, for example, be hollow balls that reduce the density of cultured leather 40. Referring to FIG. 6K, cultured leather 40 forms a plurality of apertures 49, which may be pores, that extend through each of strata 43-45. In addition to decreasing the mass of cultured leather 40, apertures 49 may increase the permeability of air and water. In footwear 10, for example, moisture produced from the foot may escape upper 30 my passing through apertures 49.

Figure 6L:
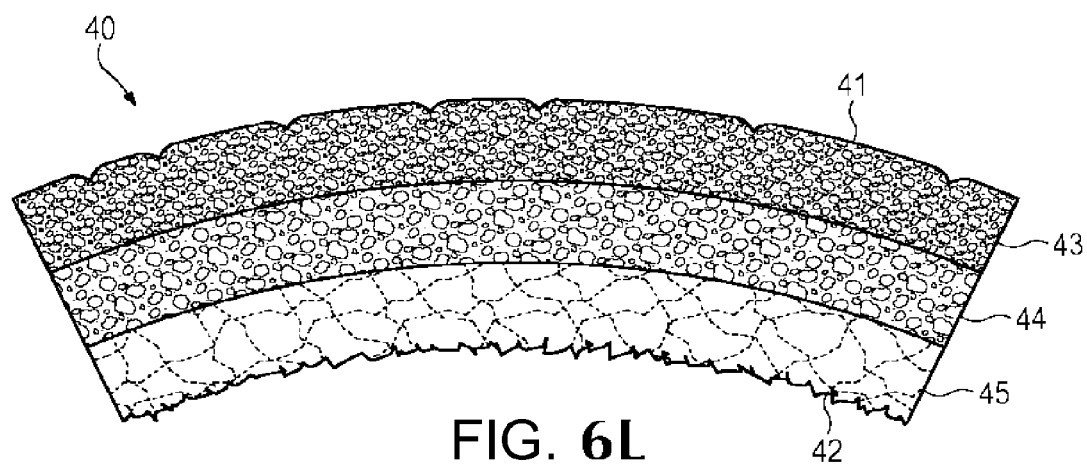
Figure 6M:
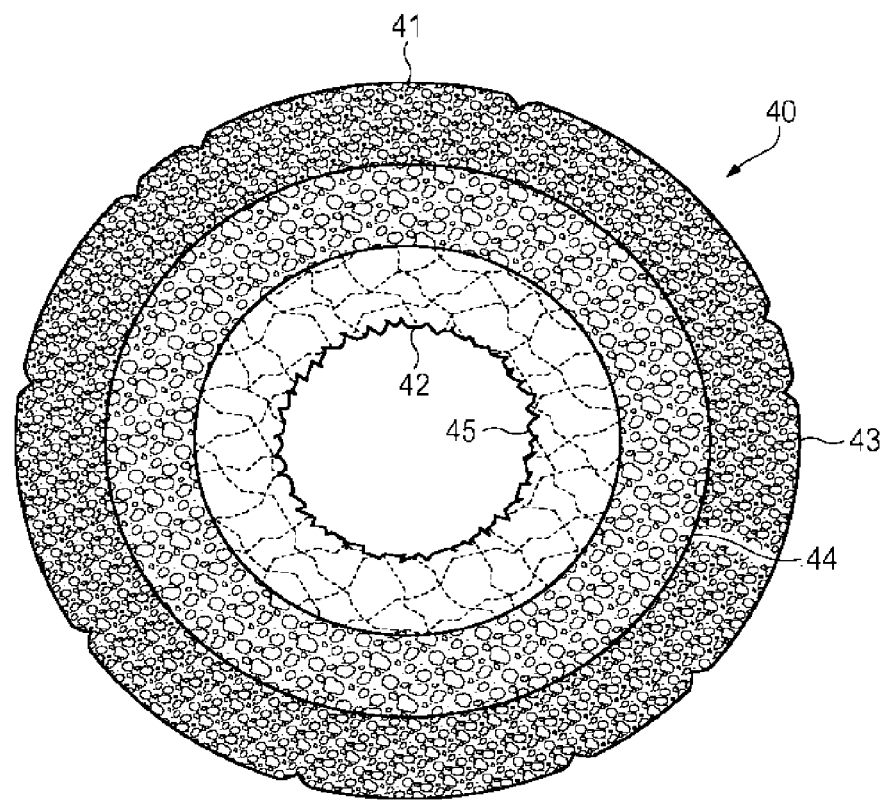

Although cultured leather 40 may exhibit a generally planar configuration, cultured leather 40 may also be produced to have three-dimensional or otherwise non-planar configurations. More particularly, cultured leather 40 may be grown on shaped scaffolds that impart a predetermined shape during in vitro production. In FIGS. 6E and 6F, for example, the thickness of cultured leather 40 varies to impart a three-dimensional aspect. Referring to FIG. 6L, cultured leather 40 has a generally curved aspect, which may be utilized against curved surfaces. In the forefoot area of footwear 10, for example, layers 35-37 wrap around the foot and over the forward area of the toes. Cultured leather 40 may be produced to exhibit this type of curvature, thereby reducing manufacturing steps in the assembly of footwear 10 that require shaping of conventional leather. In another configuration, depicted in FIG. 6M, cultured leather forms a circular or tubular structure that may be utilized for golf club grips and around steering wheels, for example.

Based upon the above discussion, cultured leather 40 may exhibit a variety of configurations with different properties. Although cultured leather 40 may be similar to conventional leather, variations in the structure of cultured leather 40 may produce configurations that differ significantly from conventional leather. In addition to textures associated with surfaces 41 and 42, variations in strata 43-45 may provide various combinations of properties. Moreover, the addition of further elements to cultured leather 40 (e.g., collagen 51, reinforcing structure 52, spherical members 53) may impart further variations. Accordingly, cultured leather 40 may exhibit a variety of properties, which at least partially depend upon the overall structure and configuration of cultured leather 40.

In Vitro Production

Cultured leather 40 is produced in vitro, which involves manufacturing in a laboratory or other controlled environment without growing in living organisms or harvesting from the living organisms. A variety of conventional techniques may be utilized to produce cultured leather 40. In general, each of the techniques involves placing tissue that grows to form cultured leather 40 on a culture medium, which provides water and nutrients. The techniques may also involve providing a suitable mixture of oxygen and carbon dioxide, as well as other gasses, to the tissue during growth.

Examples of conventional techniques for in vitro production include the plasma clot method, raft method, agar gel method, and grid method. The plasma clot method involves growing tissue on the surface of a culture medium that includes chick (i.e., infant chicken) plasma and chick embryo extract. The raft method includes placing tissue on a raft of lens paper or rayon acetate, which is floated on a culture medium. The agar gel method includes placing tissue upon a culture medium that is gelled with one-percent agar and includes a suitable salt solution, serum, and a mixture of amino acids and vitamins. Additionally, the grid method involves placing tissue upon a wire mesh or perforated stainless steel sheet that is located at a surface of the culture medium. As further examples, various techniques and apparatuses for in vitro production are disclosed in U.S. Pat. No. 7,419,819 to Nishimoto, et al.; U.S. Pat. No. 7,435,594 to Gong, et al. U.S. Pat. No. 7,504,258 to McAllister, et al. U.S. Pat. No. 7,547,540 to Takagi, et al. U.S. Pat. No. 7,723,105 to Bordoni, et al.; U.S. Pat. No. 7,598,076 to Wedell, et al.; U.S. Pat. No. 7,635,575 to Scherze, et al.; U.S. Pat. No. 7,666,416 to Etcheverry, et al.; U.S. Pat. No. 7,691,625 to Kuwabara, et al.; U.S. Pat. No. 7,691,626 to McCabe, et al.; U.S. Pat. No. 7,732,204 to Donahue; U.S. Pat. No. 7,745,209 to Martin, et al.; and U.S. Pat. No. 7,754,478 to Suzuki, et al., each of which is incorporated herein by reference.

Figure 7:
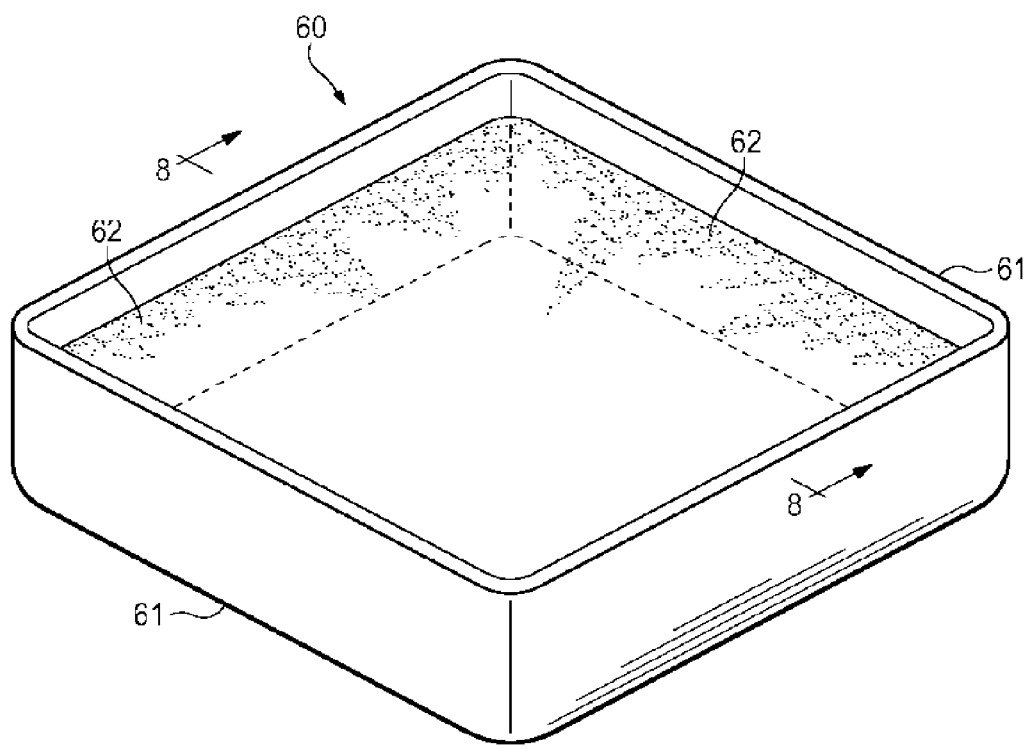
FIG. 7 is a perspective view of a portion of an apparatus for producing the cultured leather.
Figure 8:
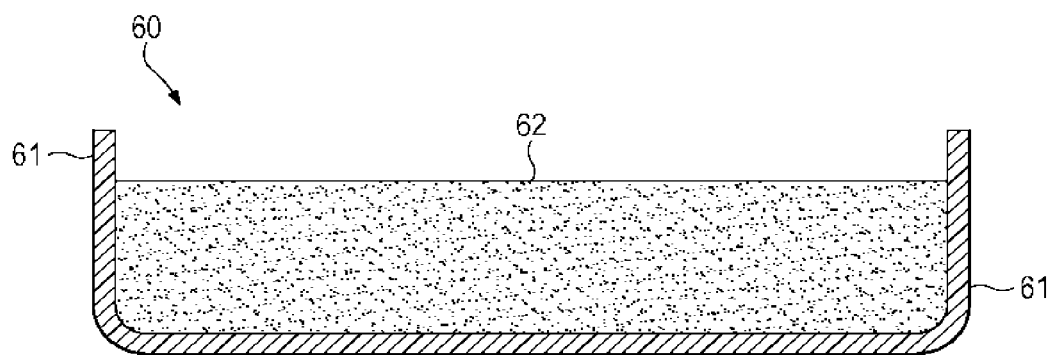
FIG. 8 is a cross-sectional view of the portion of an apparatus for producing the cultured leather.

A portion of an apparatus 60 for producing cultured leather 40 is depicted in FIGS. 7 and 8. Apparatus 60 includes a container 61 and a culture medium 62. Container 61 includes sides and a bottom that define an interior area. Although depicted as square, container 61 may exhibit a variety of shapes that are suitable for producing cultured leather. Culture medium 62 is located within the interior area of container 61 and may be any conventional or non-conventional culture medium that facilitates in vitro production of cultured leather 40. Although not depicted, apparatus 60 may also include a variety of other elements that promote the production of cultured leather 40, including (a) devices for controlling temperature, humidity, and gas composition in the area of container 61, (b) pH monitors, (c) a microscope for observing tissue growth, and (d) a lid or other protective cover element that extends over an upper area of container 61, for example.

Figure 9A:
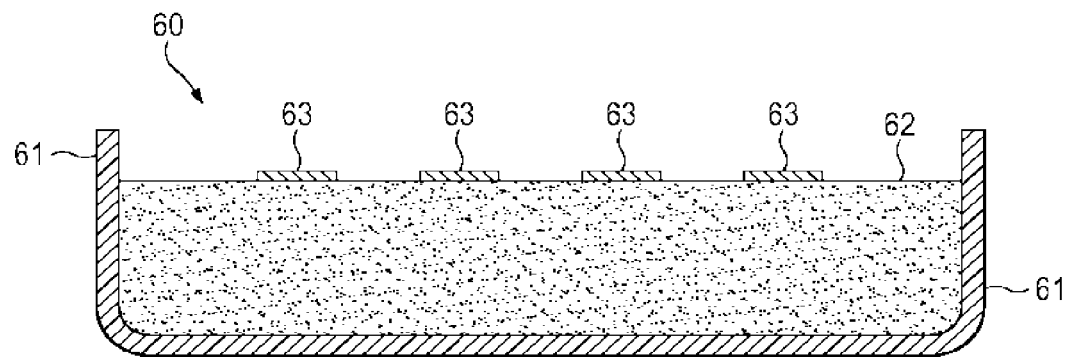
FIGS. 9A-9C are schematic cross-sectional views corresponding with FIG. 8 and depict a method of producing the cultured leather.
Figure 9B:
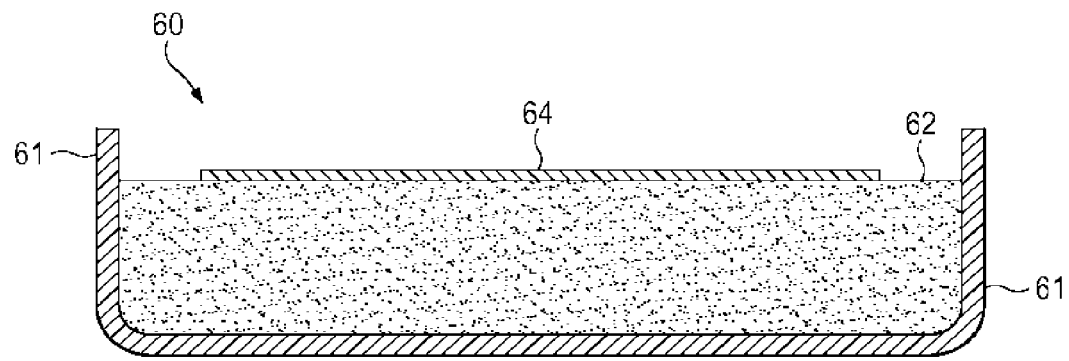
Figure 9C:
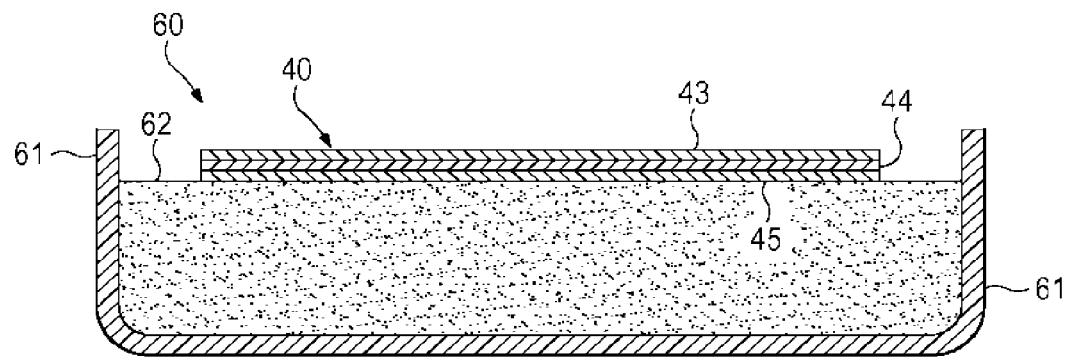

An example of a method for the in vitro production of cultured leather 40 is depicted in FIGS. 9A-9C. Referring to FIG. 9A, various explants 63 are placed upon a surface of culture medium 62. Explants 63 are isolated dermal cells or pieces of dermal tissue. Nutrients and water from culture medium 62, as well as oxygen from the air surrounding explants 63, are then absorbed by explants 63 to promote growth. Additionally, elements of apparatus 60 may control the temperature, humidity, and gas composition around explants 63 to further promote growth. Cells within explants 63 may then divide to form a tissue layer 64 over a portion of the surface of culture medium 62, as depicted in FIG. 9B. Following further cell division, differentiation of the cells may occur to form the various strata 43-45, as depicted in FIG. 9C, and substantially form the structure of cultured leather 40. Additional tanning steps may then be performed to prevent deterioration of cultured leather 40. Moreover, cultured leather 40 may then be incorporated into footwear 10 or other products.

Figure 10A:
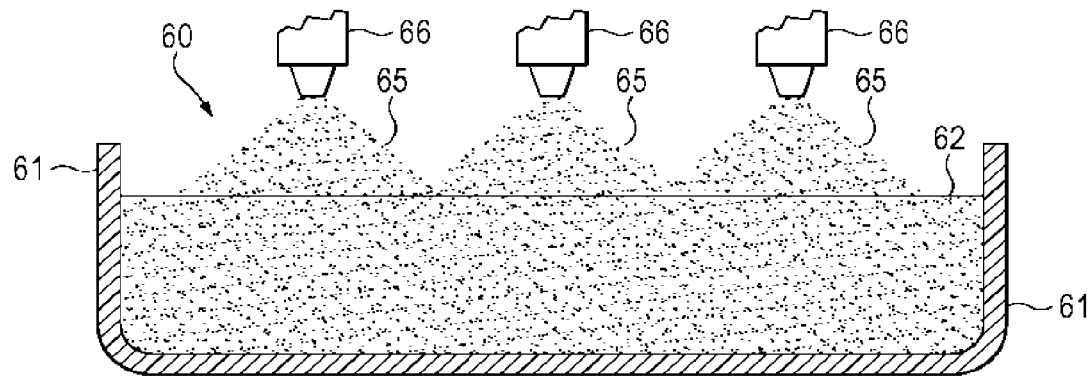
FIGS. 10A-10C are schematic cross-sectional views corresponding with FIG. 8 and depict another method of producing the cultured leather.
Figure 10B:
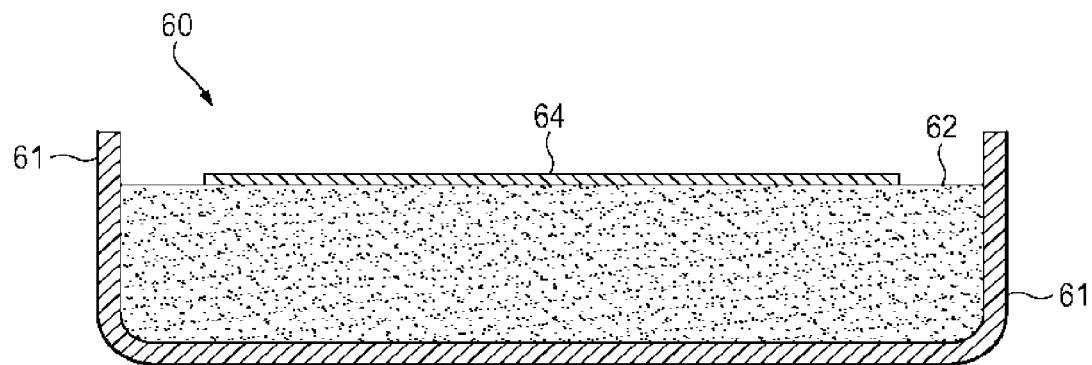
Figure 10C:
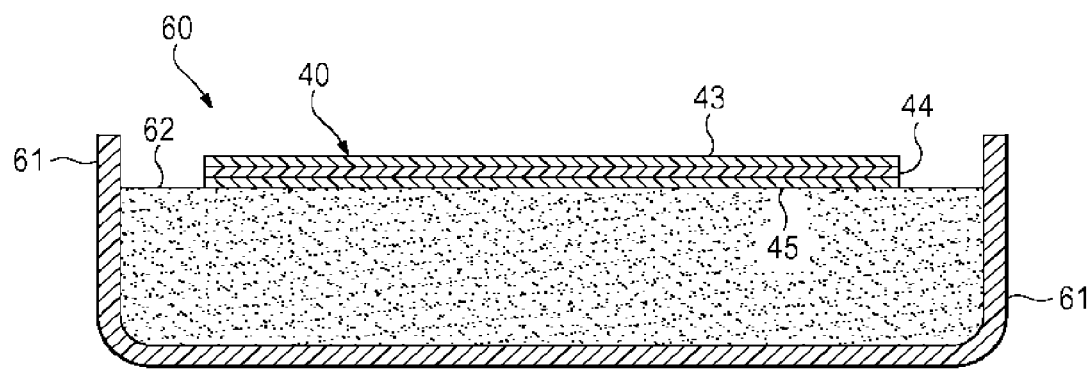

Another example of a method for the in vitro production of cultured leather 40 is depicted in FIGS. 10A-10C. Referring to FIG. 10A, a solution 65 containing dermal cells may be sprayed or otherwise deposited upon the surface of culture medium 62 from one or more nozzles 66. Although the configuration of nozzles 66 may vary considerably, digital cell cartridges (e.g., similar to ink cartridges of ink printers) may be utilized to disperse the cells. Once applied, the cells within solution 65 may divide to form tissue layer 64 over a portion of the surface of culture medium 62, as depicted in FIG. 10B. Following further cell division, differentiation of the cells may occur to form the various strata 43-45, as depicted in FIG. 10C, and substantially form the structure of cultured leather 40. An advantage to this process, is that various solutions (similar to solution 65) may be deposited at different stages of the method to induce specific strata to form within cultured leather 40. Moreover, the types of cells, nutrients, hormones, and chemicals that are deposited at the different stages of the process may vary to induce variations in the resulting configuration of cultured leather 40. In a similar process, a slurry (e.g., an aqueous solution including dermal cells) may be poured onto the surface of culture medium 65.

Figure 11A:
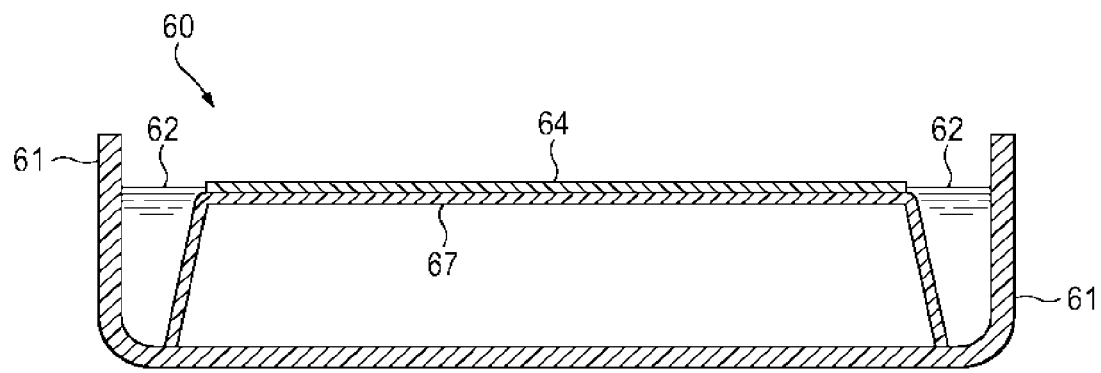
FIGS. 11A-11C are schematic cross-sectional views corresponding with FIG. 8 and depict further configurations of the apparatus for producing the cultured leather.
Figure 11B:
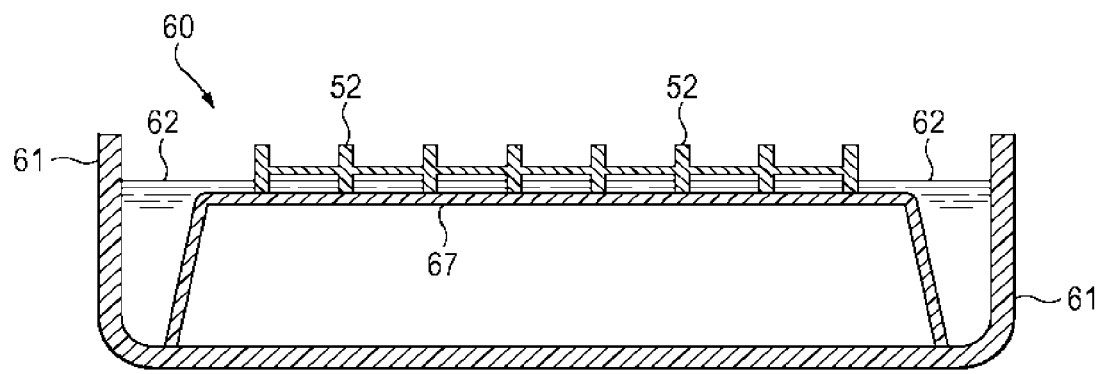
Figure 11C:
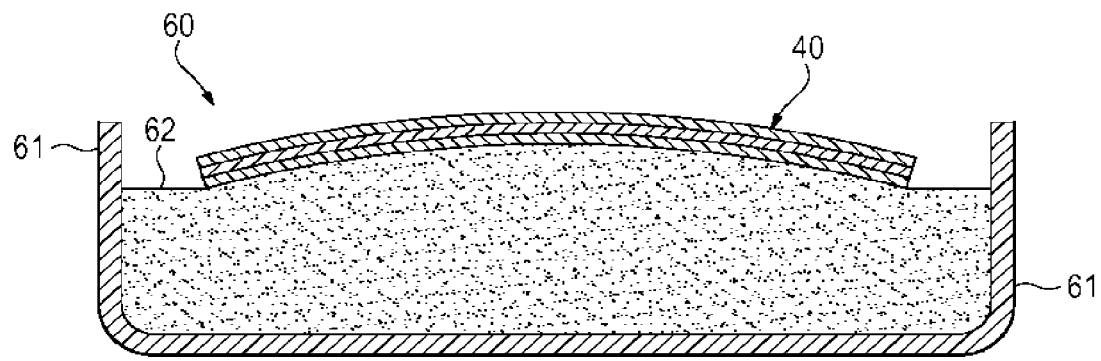

A variety of further methods for the in vitro production of cultured leather 40 may be utilized. Depending upon the properties of culture medium 62, rafts or grids may be utilized to support explants 63, tissue layer 64, or the resulting cultured leather 40. Referring to FIG. 11A, tissue layer 64 is depicted as resting upon a support 67 within culture medium 62. A similar configuration may be utilized to locate reinforcing structure 52 (e.g., as from FIG. 6I) during the in vitro production, as depicted in FIG. 11B. Additionally, contouring of culture medium 62 may be utilized to form a corresponding shaped, three-dimensional, or non-planar structure to cultured leather 40, as depicted in FIG. 11C. As an alternative, support 67 or similar structures may be contoured to impart a contoured shape to cultured leather 40. Accordingly, a variety of variations upon apparatus 60 may be utilized for different production methods or resulting configurations of cultured leather 40.

Figure 12:
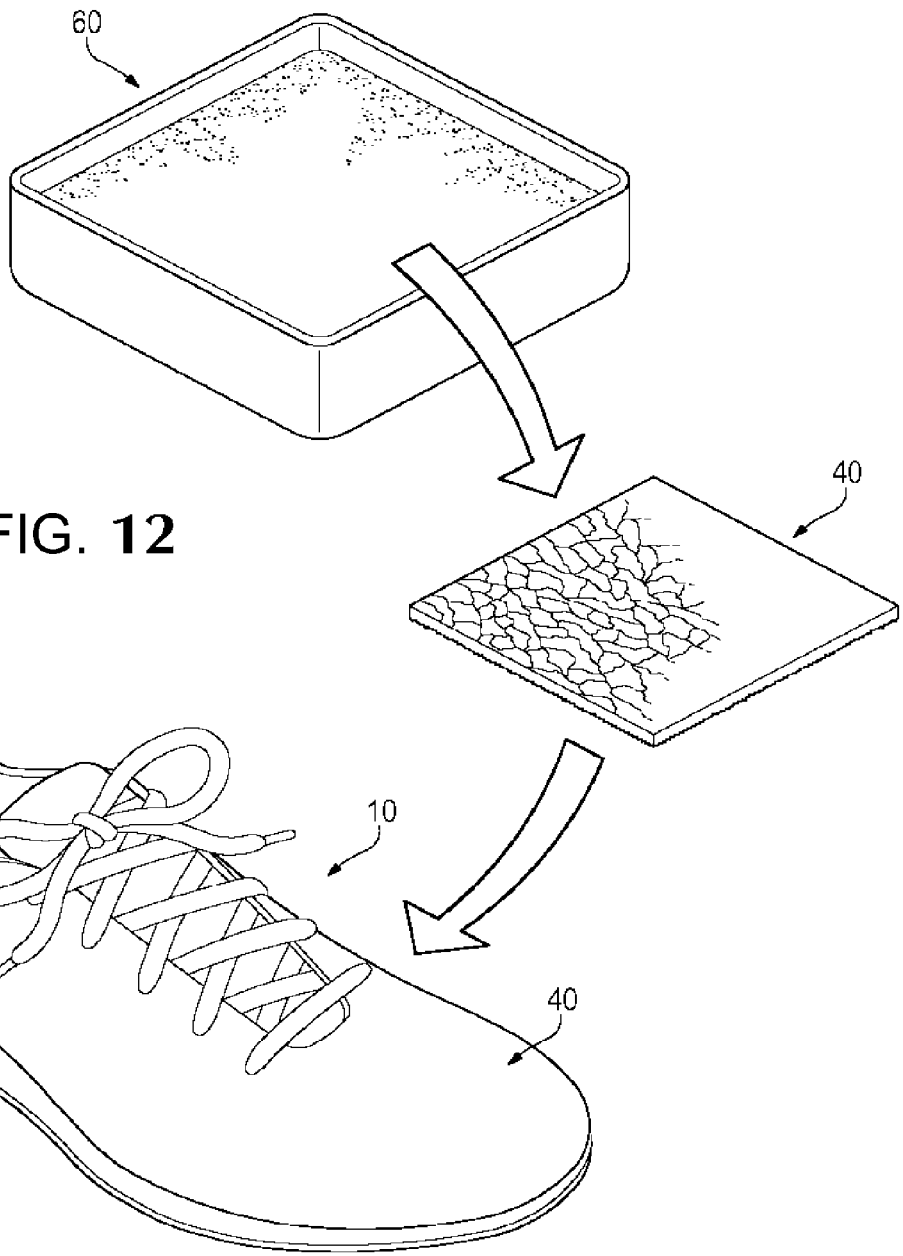
FIG. 12 is a perspective view of a portion of the method of producing the cultured leather.

Following the in vitro production of cultured leather 40 through any of the general processes discussed above or another process, cultured leather 40 may be removed from apparatus 60 and incorporated into footwear 10, as depicted in FIG. 12. Although tanning or other preservation processes may be utilized, some methods for the in vitro production of cultured leather 40 may incorporate preservation processes. For example, modifications that affect the processing of cultured leather 40 may be made through genetic engineering, which change the structure of proteins. As another example, final stages of in vitro production may involve triggering a bioengineered cellular compound (e.g., tannin) that fixes or stabilizes cultured leather 40, thereby effectively tanning or preserving cultured leather 40 without the need for additional tanning steps. Either of these examples may allow tanning and processing to occur with less environmental impact than a conventional tanning process (e.g., a reduction in the number and quantity of chemicals used in a conventional tanning process).

Based upon the above discussion, various methods and apparatuses may be utilized for the in vitro production of cultured leather 40. In general, however, cultured leather 40 is produced without growing in living organisms or harvesting from the living organisms, which may allow particular properties to be engineered into the resulting product, while reducing impacts upon the environment and the living organisms from which conventional leather is harvested.

Further Products

Figure 13A:
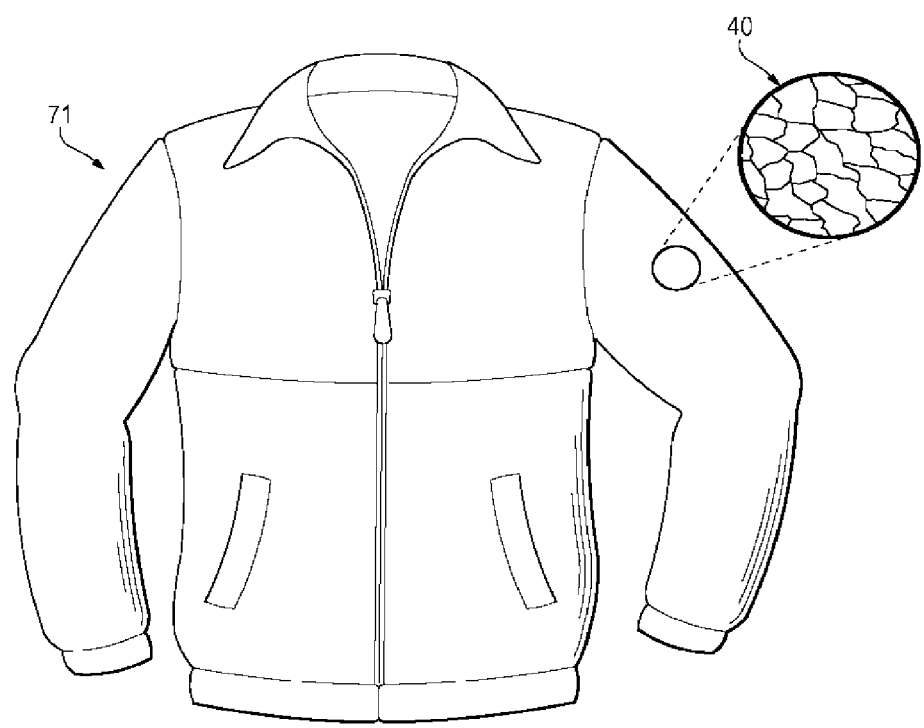
FIGS. 13A-13F are perspective views of products incorporating the cultured leather.
Figure 13B:
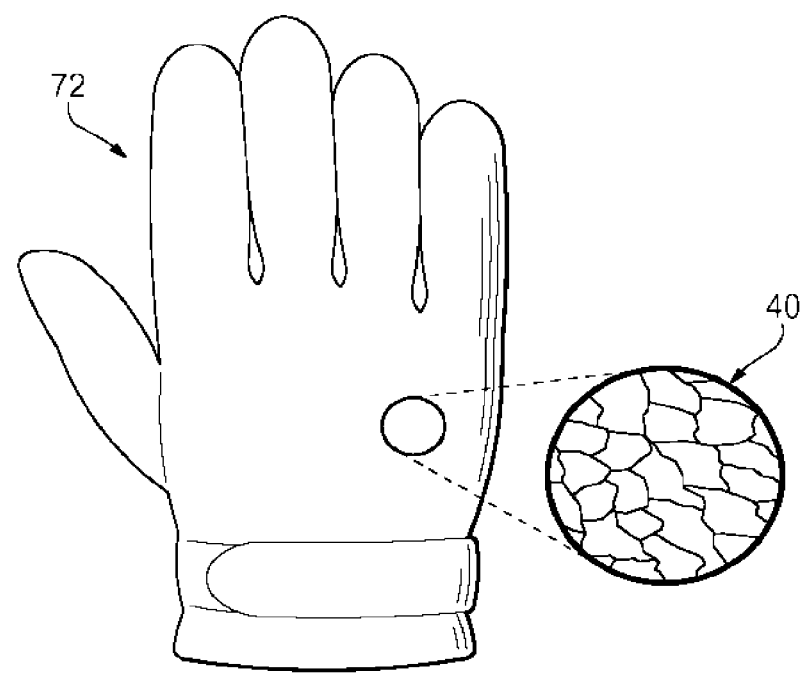
Figure 13C:
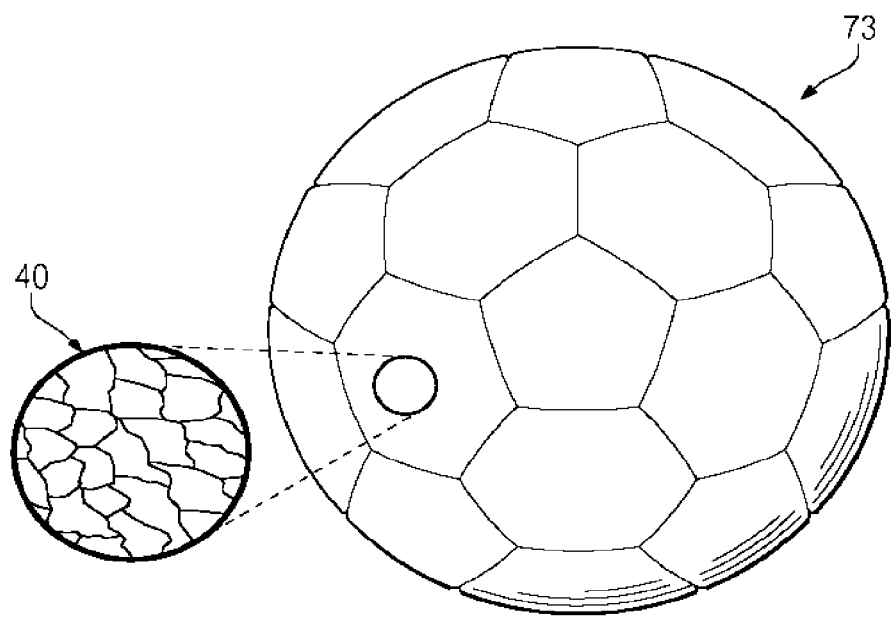
Figure 13D:
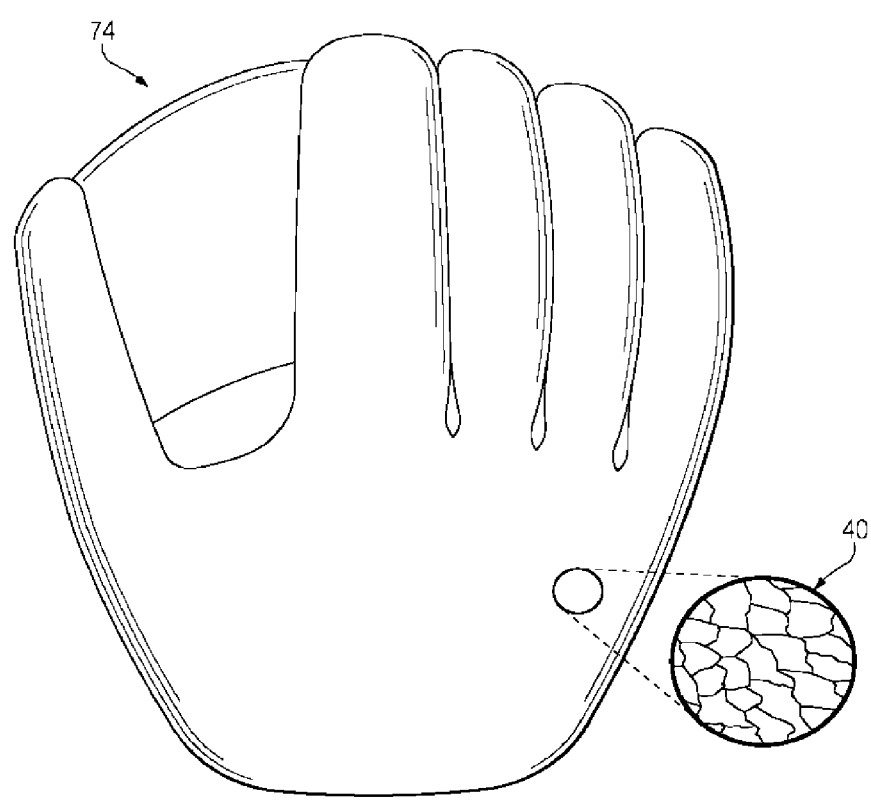
Figure 13E:
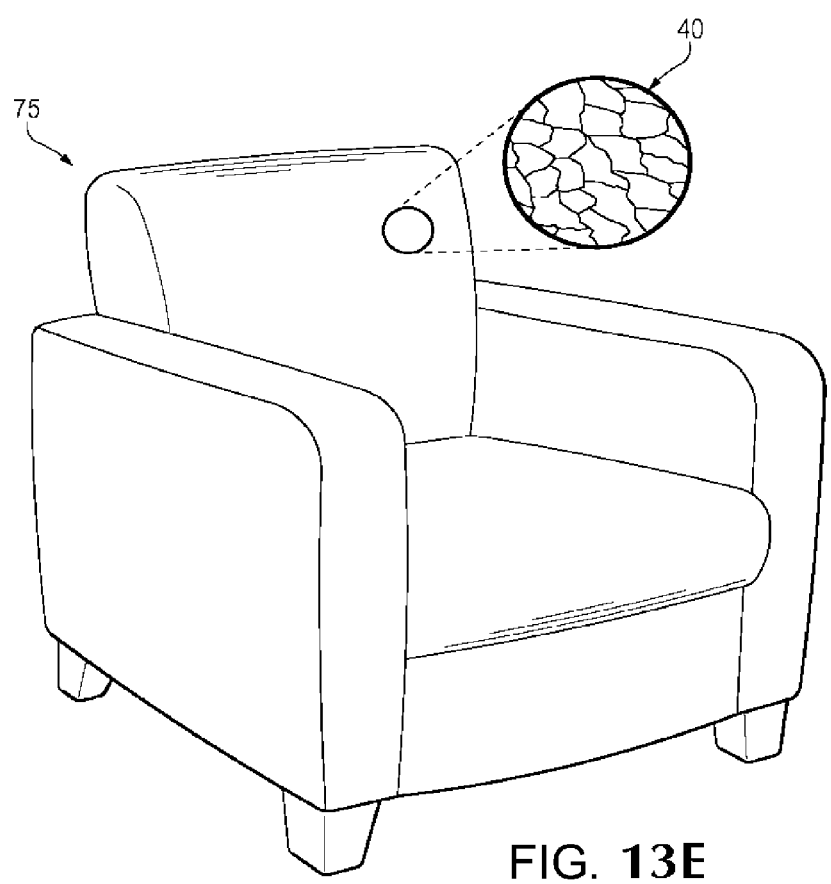
Figure 13F:
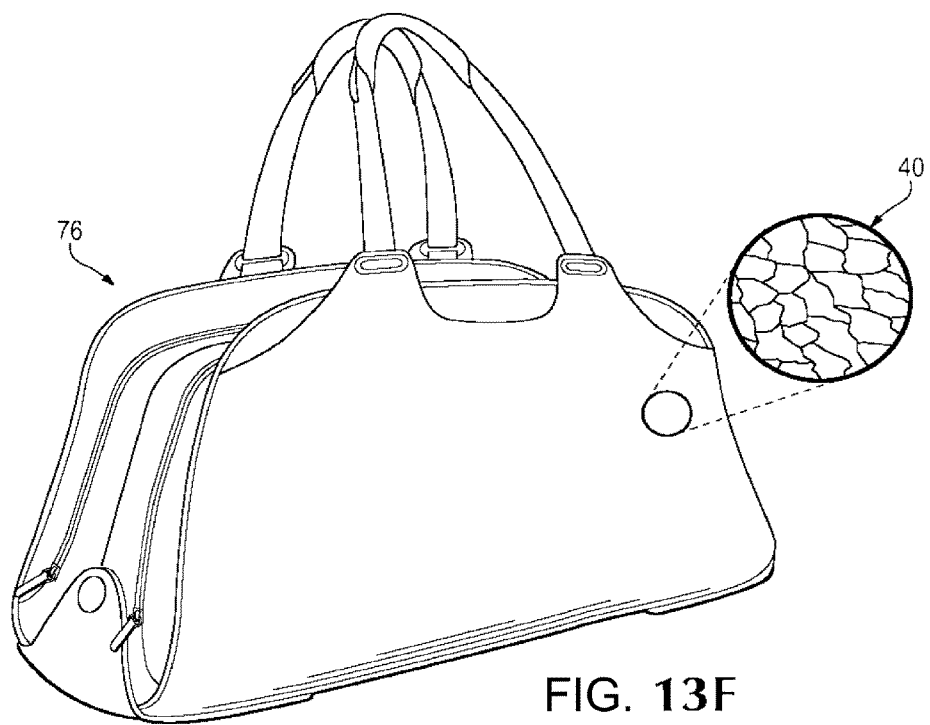

In addition to footwear 10, cultured leather 40 may be incorporated into an array of other products, including apparel, athletic equipment, furniture, bags, or any other consumer or industrial product that commonly incorporates conventional leather or synthetic leather. As examples of apparel, FIG. 13A depicts a jacket 71 that incorporates cultured leather 40, and FIG. 13B depicts a glove 72 that incorporates cultured leather 40. As examples of athletic equipment, FIG. 13C depicts a ball 73 that incorporates cultured leather 40, and FIG. 13D depicts a ball glove 74 that incorporates cultured leather 40. As an example of furniture, FIG. 13E depicts a recliner or chair 75 that incorporates cultured leather 40. Additionally, a bag 76 that incorporates cultured leather 40 is depicted in FIG. 13F. Other examples of bags that may incorporate cultured leather 40 include backpacks, messenger bags, luggage, handbags, and purses. Accordingly, a variety of products, as well as footwear 10, may incorporate cultured leather 40.

The invention is disclosed above and in the accompanying figures with reference to a variety of configurations. The purpose served by the disclosure, however, is to provide an example of the various features and concepts related to the invention, not to limit the scope of the invention. One skilled in the relevant art will recognize that numerous variations and modifications may be made to the configurations described above without departing from the scope of the present invention, as defined by the appended claims.

The invention claimed is:

1. A method of manufacturing a product, the method comprising:
providing a container apparatus, the container apparatus including a culture medium and a support element therein;
placing at least one reinforcing structure on the support element;
introducing dermal cells into the culture medium, so that the dermal cells grow and divide to form a tissue layer including a first stratum on a first side of the tissue layer, a second stratum on a second side of the tissue layer and having different properties than the first stratum, and a third stratum disposed between the first stratum and the second stratum, wherein various solutions are deposited at different stages to induce specific strata to form, and wherein the reinforcing structure extends into both the first stratum and the second stratum and the reinforcing structure has (a) a first portion that extends into the third stratum such that the first portion of the reinforcing structure is parallel to both a first surface and a second surface of the third stratum, (b) a second portion that is perpendicular to the first portion of the reinforcing structure, the second portion of the reinforcing structure extending from the first portion through both the third stratum and the first stratum such that the second portion is surrounded by the third stratum and the first stratum, and (c) a third portion that is perpendicular to the first portion of the reinforcing structure, the third portion extending from the first portion through both the third stratum and the second stratum such that the third portion is surrounded by the third stratum and the second stratum; and wherein the second stratum has different properties that the first stratum, wherein the tissue layer grows around the at least one reinforcing structure in such a manner as to completely surround the at least one reinforcing structure, thereby forming a cultured leather that incorporates the at least one reinforcing structure;

removing the cultured leather from the container apparatus; and incorporating the cultured leather into a product.

2. The method of claim 1, wherein the product is selected from the group consisting of footwear, apparel, athletic equipment, furniture, and bags.

3. The method of claim 1, wherein the support element and the at least one reinforcing structure are configured such that the at least one reinforcing structure is at least partially submerged in the culture medium.

4. The method of claim 1, wherein the at least one reinforcing structure comprises a single scaffold which the cultured leather surrounds.

5. The method of claim 1, wherein-the reinforcing structure further includes a plurality of portions extending from a point in the first stratum through the third stratum and into the second stratum.

6. The method of claim 1, wherein the least one reinforcing structure comprises a plurality of hollow spherical elements; the plurality of hollow spherical elements reducing the density of the cultured leather as compared to a substantially identical cultured leather that does not include any such plurality of hollow spherical elements.

7. The method of claim 1, wherein the reinforcing structure increases a stiffness of the cultured leather as compared to a substantially identical cultured leather that does not include any such reinforcing structure.

8. A method of manufacturing a product, the method comprising:

providing a container apparatus, the container apparatus including a culture medium therein;

depositing at least one explant onto the culture medium, the explant containing dermal cells, so that the dermal cells grow and divide to form a tissue layer, whereby various solutions are deposited at different stages to induce specific strata to form, and the tissue layer undergoes cell differentiation to form a cultured leather including a first stratum, a second stratum differing from the first stratum with respect to at least one physical property, and a third stratum disposed between the first stratum and the second stratum, wherein a reinforcing structure extends into both the first stratum and the second stratum and the reinforcing structure has (a) a first portion that extends into the third stratum such that the first portion of the reinforcing structure is parallel to both a first surface and a second surface of the third stratum, (b) a second portion that is perpendicular to the first portion of the reinforcing structure, the second portion of the reinforcing structure extending from the first portion through both the third stratum and the first stratum such that the second portion is surrounded by the third stratum and the first stratum, and (c) a third portion that is perpendicular to the first portion of the reinforcing structure, the third portion extending from the first portion through both the third stratum and the second stratum such that the third portion is surrounded by the third stratum and the second stratum; and wherein the second stratum has different properties that the first stratum, removing the cultured leather from the container apparatus; and incorporating the cultured leather into a product.

9. The method of claim 8, wherein the method further includes a step of controlling at least one of temperature, humidity, and gas composition within the container apparatus in such a manner as to promote growth of the dermal cells.

10. The method of claim 8, wherein the method further comprises a step of triggering a bioengineered cellular compound that stabilizes the cultured leather, thereby effectively tanning the cultured leather, prior to incorporating the cultured leather into a product.

11. The method of claim 10, wherein the bioengineered cellular compound comprises tannin.

12. The method of claim 8, wherein the step of depositing at least one explant onto the culture medium whereby the tissue layer undergoes cell differentiation to form a cultured leather includes cell differentiation to form the cultured leather having the first stratum, the second stratum, and a third stratum;

wherein each of the first stratum, the second stratum, and the third stratum differ from each other with respect to at least one property.

13. The method of claim 8, wherein the container apparatus further includes a plurality of reinforcing structures therein;

the step of depositing at least one explant onto the culture medium so that the dermal cells grow and divide to form a tissue layer includes the tissue layer growing around the plurality of reinforcing structures in such a manner as to completely surround the plurality of reinforcing structures, thereby forming a cultured leather that incorporates the plurality of reinforcing structures; and the plurality of reinforcing structure comprise a plurality of hollow spherical elements; the plurality of hollow spherical elements reducing the density of the cultured leather as compared to a substantially identical cultured leather that does not include any such plurality of hollow spherical elements.

14. The method of claim 8, wherein the container apparatus further includes a support element therein;

the method further comprises a step of placing the reinforcing structure on the support element;

the step of depositing at least one explant onto the culture medium so that the dermal cells grow and divide to form a tissue layer includes the tissue layer growing around the reinforcing structure in such a manner as to completely surround the reinforcing structure, thereby forming a cultured leather that incorporates the at least one reinforcing structure;

wherein the support element and the reinforcing structure are configured such that the reinforcing structure is at least partially submerged in the culture medium;

wherein the reinforcing structure imparts a stiffness differentiation in at least one axis of the cultured leather; and wherein the reinforcing structure imparts a tensile strength differentiation in at least one axis of the cultured leather.

* * * * *